(12) United States Patent
Kim et al.

(10) Patent No.: US 8,559,352 B2
(45) Date of Patent: Oct. 15, 2013

(54) APPARATUS AND METHOD FOR MULTICAST BROADCAST SERVICE IN WIRELESS COMMUNICATION SYSTEM THAT USES MULTI-CARRIER

(75) Inventors: Kyung-Kyu Kim, Seoul (KR); Jae-Jeong Shim, Seongnam-si (KR); Tae-Young Kim, Seongnam-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 13/096,066

(22) Filed: Apr. 28, 2011

(65) Prior Publication Data
US 2011/0268008 A1 Nov. 3, 2011

(30) Foreign Application Priority Data

Apr. 30, 2010 (KR) .................. 10-2010-0040472
May 7, 2010 (KR) .................. 10-2010-0043235

(51) Int. Cl.
*H04H 20/71* (2008.01)
*H04W 4/00* (2009.01)

(52) U.S. Cl.
USPC ........................................ 370/312; 370/329

(58) Field of Classification Search
None
See application file for complete search history.

(56) References Cited

U.S. PATENT DOCUMENTS

| | | | |
|---|---|---|---|
| 2011/0028148 A1* | 2/2011 | Lee et al. | 455/435.2 |
| 2011/0039593 A1* | 2/2011 | Lee et al. | 455/515 |
| 2012/0093079 A1* | 4/2012 | Yuk et al. | 370/328 |
| 2012/0287837 A1* | 11/2012 | Kim et al. | 370/312 |
| 2012/0294222 A1* | 11/2012 | Kim et al. | 370/312 |
| 2012/0314675 A1* | 12/2012 | Vujcic | 370/329 |
| 2013/0010694 A1* | 1/2013 | Yu et al. | 370/328 |
| 2013/0016673 A1* | 1/2013 | Kim et al. | 370/329 |

* cited by examiner

*Primary Examiner* — Clemence Han
(74) *Attorney, Agent, or Firm* — Jefferson IP Law, LLP

(57) ABSTRACT

A method for operating a base station for Multicast Broadcast Services (MBS) in a wireless communication system that uses a multi-carrier is provided. In the method, MBS capability exchange is performed on a terminal using a primary carrier. A first message for configuring at least one MBS service flow is received from the terminal. A second message is transmitted to the terminal in response to the first message. The second message includes switching information between the primary carrier and a secondary carrier. MBS data is transmitted using the secondary carrier.

34 Claims, 17 Drawing Sheets

APPARATUS AND METHOD FOR MULTICAST BROADCAST SERVICE IN WIRELESS COMMUNICATION SYSTEM THAT USES MULTI-CARRIER

PRIORITY

This application claims the benefit under 35 U.S.C. §119 (a) of a Korean patent application filed in the Korean Intellectual Property Office on Apr. 30, 2010 and assigned Serial No. 10-2010-0040472 and a Korean patent application filed in the Korean Intellectual Property Office on May 7, 2010 and assigned Serial No. 10-2010-0043235, the entire disclosures of each of which are hereby incorporated by reference.

BACKGROUND OF THE INVENTION

1. Field of the Invention

The present invention relates to an Enhanced-Multicast Broadcast Services (E-MBS) in a wireless communication system. More particularly, the present invention relates to an apparatus and a method for switching to a dedicated carrier for an E-MBS in a wireless communication system that uses a multi-carrier.

2. Description of the Related Art

As broadband wireless networks that provide an Internet service in a mobile environment are rapidly distributed, expectation for a new application based on this technology increases. One application receiving attention is a multimedia streaming service. Where many users receive the same multimedia service (for example, news, sports live relay) at the same time, when a point-to-point channel is used to transmit multimedia data to each of multimedia service users, a radio resource having a large amount of bandwidth is required.

To efficiently transmit a multimedia service to many users simultaneously in view of resources and costs, most standardization research organizations are developing standards for functional architecture to support an efficient multicast/broadcast service at a network level. For example, the $3^{rd}$ Generation Partnership Project (3GPP) and the 3GPP2 standardization organizations have already defined a Multimedia Broadcast/Multicast Service (MBMS) architecture and a Broadcast/Multicast Service (BCMCS), respectively. Similarly, the WiMAX forum that defines a network architecture for a broadband wireless access network based on IEEE 802.16 defines an architecture for an Enhanced-Multicast Broadcast Service (E-MBS).

As an important concept of IEEE 802.16e standardization, seamless broadcast service is provided using an E-MBS zone. The E-MBS zone binds a plurality of base stations and provides the service to the same service area. In the same E-MBS zone, a terminal shares multicast parameters, and may omit a resetting procedure and perform a service even when the terminal moves to another base station.

An IEEE 802.16m system supports a multi-carrier environment that can perform transmission or reception using a plurality of carriers defined as predetermined bandwidths. A base station and a terminal may be defined to perform transmission/reception using only independent carriers, respectively, or may be configured to perform transmission/reception at a wide band formed through aggregation of a plurality of carriers. Respective carriers may be successively arranged or disposed apart from each other on a frequency. The configuration of a set may change statically or dynamically. For the IEEE 802.16m system to efficiently distribute resources, the IEEE 802.16m system performs a service using an exclusive carrier for an E-MBS.

However, a wireless communication system that uses a multi-carrier such as the IEEE 802.16m system does not define a specific E-MBS service procedure for an E-MBS under an environment where a service is provided using an exclusive E-MBS carrier. Accordingly, an apparatus and a method for a multicast broadcast service in a wireless communication system that uses a multi-carrier are desired.

SUMMARY OF THE INVENTION

Aspects of the present invention are to address at least the above-problems and/or disadvantages and to provide at least the advantages described below. Accordingly, an aspect of the present invention is to provide an apparatus and a method for a multicast broadcast service in a wireless communication system that uses a multi-carrier.

Another aspect of the present invention is to provide an apparatus and a method for switching to an exclusive carrier for an Enhanced-Multicast Broadcast System (E-MBS) in a wireless communication system that uses a multi-carrier.

In accordance with an aspect of the present invention, a method for operating a base station for Multicast Broadcast Services (MBS) in a wireless communication system that uses a multi-carrier is provided. The method includes performing MBS capability exchange on a terminal using a primary carrier, receiving a first message for configuring at least one MBS service flow from the terminal, transmitting a second message to the terminal in response to the first message, the second message including switching information between the primary carrier and a secondary carrier, and transmitting MBS data using the secondary carrier.

In accordance with another aspect of the present invention, a method for operating a terminal for MBS in a wireless communication system that uses a multi-carrier is provided. The method includes performing MBS capability exchange with a base station using a primary carrier, transmitting a first message for configuring at least one MBS service flow to the base station, receiving a second message including switching information between the primary carrier and a secondary carrier from the base station in response to the first message, and receiving MBS data using the secondary carrier.

In accordance with another aspect of the present invention, an apparatus of a base station, for MBS in a wireless communication system that uses a multi-carrier is provided. The apparatus includes a controller for performing MBS capability exchange on a terminal using a primary carrier, a receiver for receiving a first message for configuring at least one MBS service flow from the terminal, and a transmitter for transmitting a second message to the terminal in response to the first message, the second message including switching information between the primary carrier and a secondary carrier, and for transmitting MBS data using the secondary carrier.

In accordance with another aspect of the present invention, an apparatus of a terminal, for MBS in a wireless communication system that uses a multi-carrier is provided. The apparatus includes a controller for performing MBS capability exchange with a base station using a primary carrier, a transmitter for transmitting a first message for configuring at least one MBS service flow to the base station, and a receiver for receiving a second message from the base station in response to the first message, the second message including switching information between the primary carrier and a secondary carrier, and receiving MBS data using the secondary carrier.

In accordance with another aspect of the present invention, a wireless communication system that uses a multi-carrier for MBS is provided. The system includes a base station for performing MBS capability exchange on a terminal using a primary carrier, for receiving a first message for configuring at least one MBS service flow from the terminal, for transmitting a second message to the terminal in response to the first message, the second message including switching information between the primary carrier and a secondary carrier, and for transmitting MBS data using the secondary carrier, and the terminal for performing MBS capability exchange with the base station using the primary carrier, for transmitting the first message to the base station, for receiving the second message from the base station in response to the first message, and for receiving MBS data using the secondary carrier.

In accordance with another aspect of the present invention, a wireless communication system that uses a multi-carrier for MBS is provided. The system includes a base station for performing MBS capability exchange on a terminal using a primary carrier, for transmitting a first message including switching information between the primary carrier and a secondary carrier to the terminal in order to configure at least one MBS service flow, for receiving a second message from the terminal in response to the first message, and for transmitting MBS data using the secondary carrier, and the terminal for performing MBS capability exchange with the base station using the primary carrier, for receiving the first message from the base station, for transmitting the second message to the base station in response to the first message, and for receiving MBS data using the secondary carrier.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and a method for Multicast Broadcast Service (MBS) in a wireless communication system that uses a multi-carrier. More particularly, exemplary embodiments of the present invention provide an apparatus and a method for switching a carrier in order to efficiently receive Enhanced-MBS (E-MBS) data in a wireless communication system that uses a multi-carrier.

Hereinafter, though description is made using an IEEE 802.16m system as an example, exemplary embodiments of the present invention are also applicable to a system that transmits a multicast message using a multi-carrier, of course. In addition, exemplary embodiments of the present invention assume a case where a system that supports both a primary carrier and a secondary carrier in IEEE 802.16m provides an E-MBS using the secondary carrier. The secondary carrier serves as an exclusive carrier for an E-MBS and includes only a downlink. Although exemplary embodiments are not limited thereto, as used herein, an Advanced Base Station (ABS) is used as a node-B, and an Advanced Mobile Station (AMS) is used as a terminal.

Figure 1:
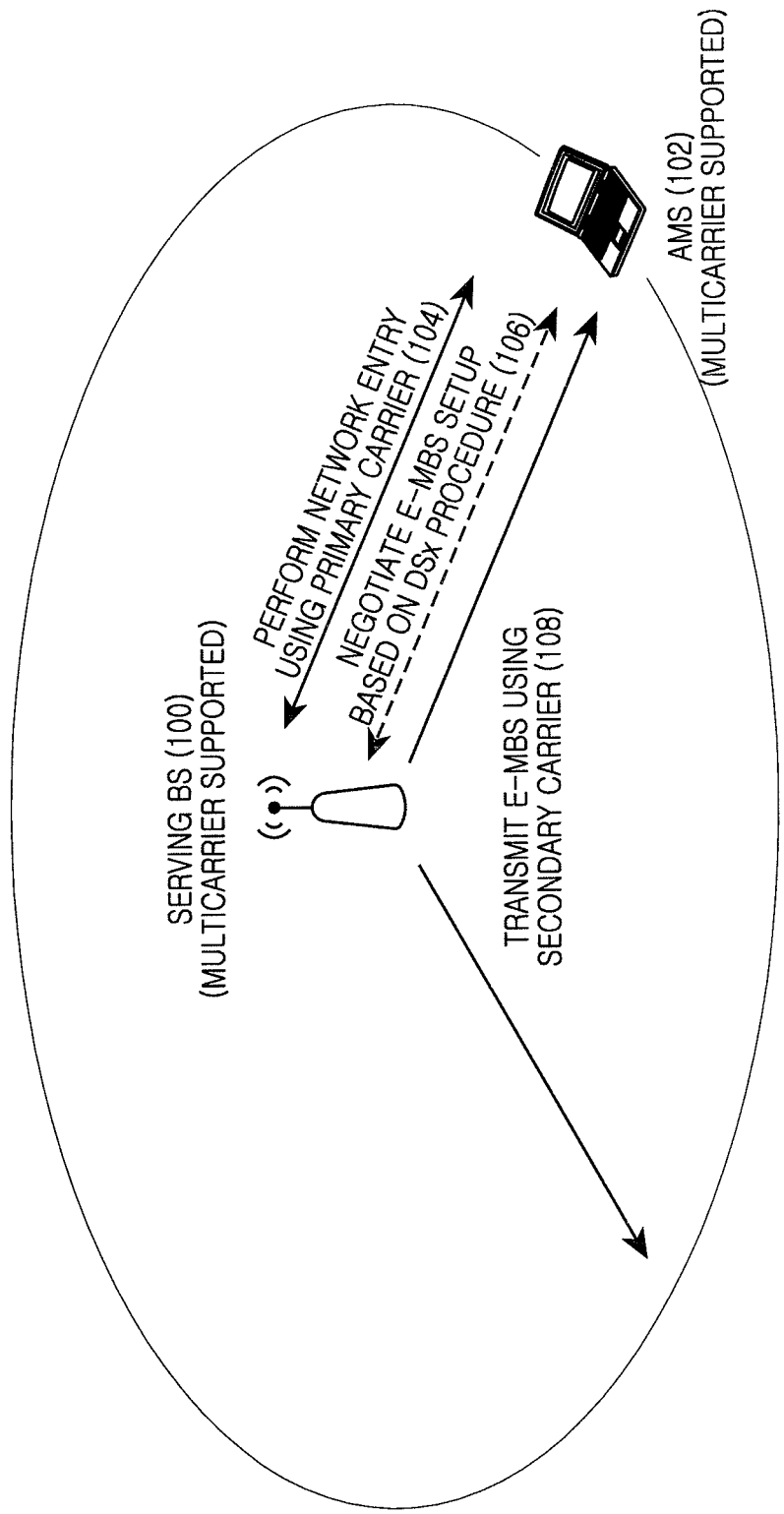
FIG. 1 illustrates a scenario of a multicast broadcast service in a wireless communication system that uses a multi-carrier according to an exemplary embodiment of the present invention.

FIG. 1 illustrates a scenario of a multicast broadcast service in a wireless communication system that uses a multi-carrier according to an exemplary embodiment of the present invention.

Referring to FIG. 1, a serving base station 100 and a terminal 102 exchange traffic and control information with each other using both a primary carrier and a secondary carrier. According to the IEEE 802.16m standard, the primary carrier serves as an Orthogonal Frequency Division Multiple Access (OFDMA) carrier through which the terminal and the base station exchange traffic and control information. The primary carrier is used for a control function for operating the terminal, such as network entry. Each terminal has only one carrier considered as a primary carrier within one cell. The secondary carrier is used for the base station and the terminal to exchange traffic with each other based on an allocation command and rules received through the primary carrier. In addition, the secondary carrier includes control signaling in order to support multi-carrier operation. According to an exemplary embodiment of the present invention, the second carrier is defined as an exclusive carrier used for providing E-MBS. Only E-MBS data of a downlink is transmitted via the secondary carrier.

An E-MBS service procedure between the terminal 102 and the serving base station 100 is described below.

The terminal 102 performs, in step 104, a network entry procedure via the primary carrier, so that the terminal 102 is in data communication with the serving base station 100 or is in a state that enables data communication. The terminal 102 exchanges AAI_REG_REQ/AAI_REG_RSP with the serving base station 100 in order to exchange E-MBS capability while performing the network entry procedure. The terminal 102 transmits an AAI_REG_REQ message to the serving base station 100 to indicate E-MBS transmission support. The serving base station 100 transmits an AAI_REG_RSP message to the terminal 102 to indicate an operation mode of E-MBS modes. In addition, the serving base station 100 periodically broadcasts configuration information for E-MBS through an AAI_E-MBS-CFG message. The configuration information for the E-MBS includes an E-MBS zone ID, the position of an E-MBS MAP, and an E-MBS Scheduling Interval (MSI). The E-MBS zone ID is an identifier for identifying a relevant E-MBS zone, and the E-MBS Scheduling Interval is a predetermined period (for example, a plurality of superframes) at which an E-MBS MAP region repeatedly appears.

In step 106, the terminal 102 performs a Dynamic Service Addition (DSA)/Dynamic Service Change (DSC)/Dynamic Service Deletion (DSD) (DSx) procedure (DSA_REQ/ DSA_RSP, DSC_REQ/DSC_RSP, DSD_REQ/DSD_RSP) with the serving base station 100. The terminal 102 transmits a DSA_REQ message to the serving base station 100 in order to connect E-MBS. The serving base station 100 responds to whether E-MBS connection is possible by transmitting a DSA_RSP message to the terminal 102 in response to the DSA_REQ. According to an exemplary embodiment of the present invention, DSC_REQ/DSC_RSP may be transmitted or DSD_REQ/DSD_RSP may be transmitted.

The serving base station 100 may transmit a DSA_REQ message to the terminal 102 in order to connect E-MBS, and the terminal 102 may respond to whether E-MBS connection is possible by transmitting a DSA_RSP message to the serving base station 100 in response to the DSA_REQ message.

When E-MBS is connected between the serving base station 100 and the terminal 102, the terminal 102 obtains E-MB ID+FID for E-MBS. The terminal 102 switches to a secondary carrier via which E-MBS data is transmitted to obtain E-MBS MAP information via the secondary carrier, and receives (108) an E-MBS data burst based on the obtained E-MBS MAP information. In the case where the terminal 102 intends to add an E-MBS channel, the terminal 102 is allocated an uplink resource to perform a DSx procedure again. An operation where the terminal 102 and the serving base station 100 switch from the primary carrier to the secondary carrier is described below with reference to FIGS. 2 and 3.

Figure 2:
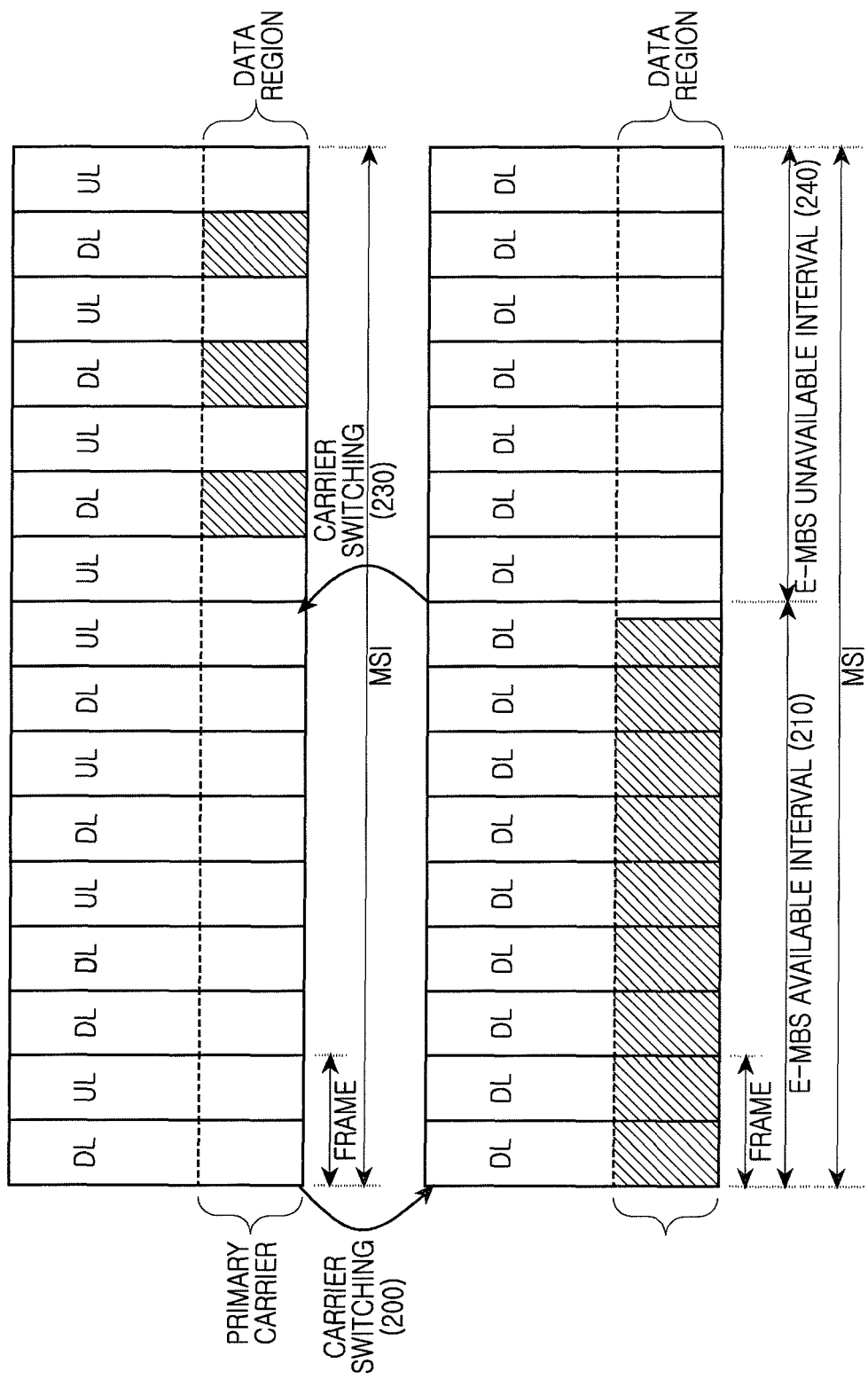
FIG. 2 illustrates a frame structure for transmitting a multicast message in a wireless communication system according to an exemplary embodiment of the present invention.

FIG. 2 illustrates a frame structure for transmitting a multicast message in a wireless communication system according to an exemplary embodiment of the present invention.

Referring to FIG. 2, the terminal 102 performs a network entry procedure with the serving base station 100 using the primary carrier. E-MBS is performed only via the secondary carrier, and only a downlink frame exists. This efficiently distributes resources by providing the E-MBS only via one carrier.

A downlink frame may be divided into an E-MBS Available interval 210 and a Unicast Available interval 240 during an E-MBS Scheduling Interval (MSI). The E-MBS Available interval 210 is a section in which an E-MBS data burst is transmitted, and the Unicast Available interval 240 is a section in which an E-MBS data burst is not transmitted.

According to an exemplary embodiment of the present invention, the E-MBS Available Interval 210 may be defined as a free E-MBS section, and the Unicast Available Interval 240 may be defined as a charged E-MBS section. While the E-MBS Available interval 210 is shown as divided into the free E-MBS section and the charged E-MBS section, the E-MBS Available interval 210 may be divided by defining two or more categories. For example, the category may be divided depending on a service grade of a subscriber terminal, and the E-MBS Available interval 210 may be determined depending on a service grade. Defining the E-MBS Available interval 210 provides available E-MBS channels to the terminal 102 as a default when the terminal 102 starts E-MBS via the secondary carrier initially. The terminal 102 switches to the secondary carrier and then may receive an E-MBS channel broadcast during the E-MBS Available interval 210.

The terminal 102 that has completed network entry based on the primary carrier should switch (200) to the secondary carrier through an MBS negotiation procedure with the serving base station 100 in order to connect to E-MBS and receive the E-MBS, separately from the connection based on the primary carrier. In addition, while receiving the E-MBS using the secondary carrier, the terminal 102 switches from the secondary carrier to the primary carrier to receive downlink data via the primary carrier during a section via which E-MBS data is not transmitted or a section undesired E-MBS data is transmitted even when the E-MBS data is transmitted. Depending on realization, the terminal 102 may switch (230)

from the secondary carrier to the primary carrier to transmit uplink data, and may switch to the primary carrier during the Unicast Available interval 240 to receive unicast data.

The terminal 102 that has completed network entry based on the primary carrier should switch (200) to the secondary carrier through an MBS negotiation procedure with the serving base station 100 in order to connect to E-MBS and receive the E-MBS, separately from the connection based on the primary carrier. In addition, while receiving the E-MBS using the secondary carrier, the terminal 102 switches from the secondary carrier to the primary carrier to receive downlink data via the primary carrier during a section via which E-MBS data is not transmitted or a section undesired E-MBS data is transmitted even when the E-MBS data is transmitted. Depending on realization, the terminal 102 may switch (230) from the secondary carrier to the primary carrier to transmit uplink data.

For this purpose, an exemplary embodiment of the present invention provides information required for switching from the primary carrier to the secondary carrier through connection based on the primary carrier using AAI_DSA-REQ and AAI_DSA-RSP as in Table 1 and Table 2. AAI_DSA-REQ may be started by a base station or a terminal.

TABLE 1

| Syntax | Size (bits) | Notes |
| --- | --- | --- |
| AAI-DSA_REQ Message format( ) | | |
| Control Message Type | 8 | |
| FID Change Count | 4 | The change count of this transaction assigned by the sender. If a new transaction is started, FID Change Count is incremented by one (modulo 16) by the sender. |
| Uplink/Downlink Indicator | 1 | 0: uplink; 1: downlink |
| QoS parameter set type | 8 | Bit 0: Provisioned Set Bit 1: Admitted Set Bit 2: Active Set |
| Service Flow Parameters | TBD | The number of included AMBS DATA IEs |
| Convergence Sublayer Parameter Encoding | TBD | |
| E-MBS Service | 12 | Indicates whether the MBS service being requested or provided for the connection that is being setup. 0: No available E-MBS 1: E-MBS in Serving ABS Only 2: E-MBS in a multi-ABS Zone supporting macro-diversity 3: E-MBS in a multi-ABS Zone not supporting macro-diversity |
| E-MBSZoneID | 7 | Indicates an E-MBS zone where the connection for associated service flow is valid. |
| E-MBS Service Flow Parameter | variable | Mapping of E-MBS ID and FID |
| PhysicalCarrierIndex | 6 | Target carrier which the AMS switches or is redirected by ABS to, only included in ABS initiated DSA-REQ |
| Carrier switching start time | TBD | TBD LSB bits of Superframe numbers at carrier switching start time |
| E-MBS/Unicast Available Interval | TBD | Number of Superframes during which an AMS stays at the target E-MBS carrier before returning to the primary carrier |
| SLPID (option) | TBD | Sleep id for each AMS which switches E-MBS carrier |

TABLE 2

| Syntax | Size | Notes |
| --- | --- | --- |
| AAI-DSA_RSP Message format( ) | | |
| Control Message Type | 8 | |
| FID Change Count | 4 | The change count of this transaction assigned by the sender. If a new transaction is started, FID Change Count is incremented by one (modulo 16) by the sender. |
| Confirmation Code | 1 | Zero indicates the request was successful. Nonzero indicates failure |
| E-MBS Service | 12 | Indicates whether the MBS service being requested or provided for the connection that is being setup. 0: No available E-MBS 1: E-MBS in Serving ABS Only 2: E-MBS in a multi-ABS Zone supporting macro-diversity 3: E-MBS in a multi-ABS Zone no supporting macro-diversity |
| E-MBSZoneID | 7 | Indicates an E-MBS zone where the connection for associated service flow is valid. |
| E-MBS Service Flow Parameter | variable | Mapping of E-MBS ID and FID |
| PhysicalCarrierIndex | 6 | Target carrier which the AMS switches or is redirected by ABS to, only included in ABS initiated DSA-REQ |
| Carrier switching start time | TBD | TBD LSB bits of Superframe numbers at carrier switching start time |
| E-MBS/Unicast Available Interval | TBD | Number of Superframes during which an AMS stays at the target E-MBS carrier before returning to the primary carrier |
| SLPID (option) | TBD | Sleep id for each AMS which switches E-MBS carrier |

The E-MBS Service field indicates whether E-MBS is requested or provided, and the E-MBS Zone ID field indicates an E-MBS zone where a connection related to a service flow is a valid. The E-MBS Service Flow Parameter field includes an E-MBS ID and FID mapping. The Physical Carrier Index is a target carrier to which a terminal switches or a target carrier redirected by a base station.

To switch from the primary carrier to the secondary carrier, carrier switching start time, E-MBS/Unicast Available Interval, and SLPID information (may be optionally added) may also be included. The carrier switching start time represents a point at which switching from the primary carrier to the second carrier is performed. The E-MBS/Unicast Available Interval is an E-MBS Available interval 210 of FIG. 2 and represents the number of superframes that occupy the secondary carrier before the terminal returns to the primary carrier. The SLPID is a slip mode identifier to allow the terminal to switch from the primary carrier to the secondary carrier.

The base station instructs a relevant terminal to efficiently change a carrier by incorporating an E-MBS/Unicast Available Interval proposed by an exemplary embodiment of the present invention into AAI_DSA-REQ/RSP. An E-MBS data burst serviced via the secondary carrier is sequentially filled from the front portion of the frame. The terminal receives an E-MBS data burst viewed by the terminal via a downlink of the secondary carrier during an E-MBS/Unicast Available Interval.

When an E-MBS data burst occurs irregularly during an E-MBS Scheduling Interval (MSI), that is, when a plurality of E-MBS/Unicast Available Intervals exist during the MSI, each E-MBS/Unicast Available Interval information may be included in an AAI_DSA-REQ message or an AAI_DSA-RSP message.

The terminal switches to the primary carrier again during the Unicast Available Interval to determine an uplink/downlink besides the E-MBS data burst and perform communication with the base station. The E-MBS/Unicast Available Interval may be determined by the base station based on a currently set E-MBS number. When the terminal adds or deletes E-MBS, the base station may reset an interval with consideration of a frame in which a relevant service is transmitted. This is valid during one E-MBS Scheduling Interval (MSI). A more detailed operation according to an exemplary embodiment of the present invention is described below with reference to FIGS. 4 to 11.

In FIG. 2, when the E-MBS Available Interval ends, the base station and the terminal automatically switch from the secondary carrier to the primary carrier, but depending on realization, they may switch the carrier only when communication of the primary carrier is required within the secondary carrier via which the E-MBS is received without having to periodically switch from the secondary carrier to the primary carrier in order to receive downlink data or uplink data based on the primary carrier.

Figure 3:
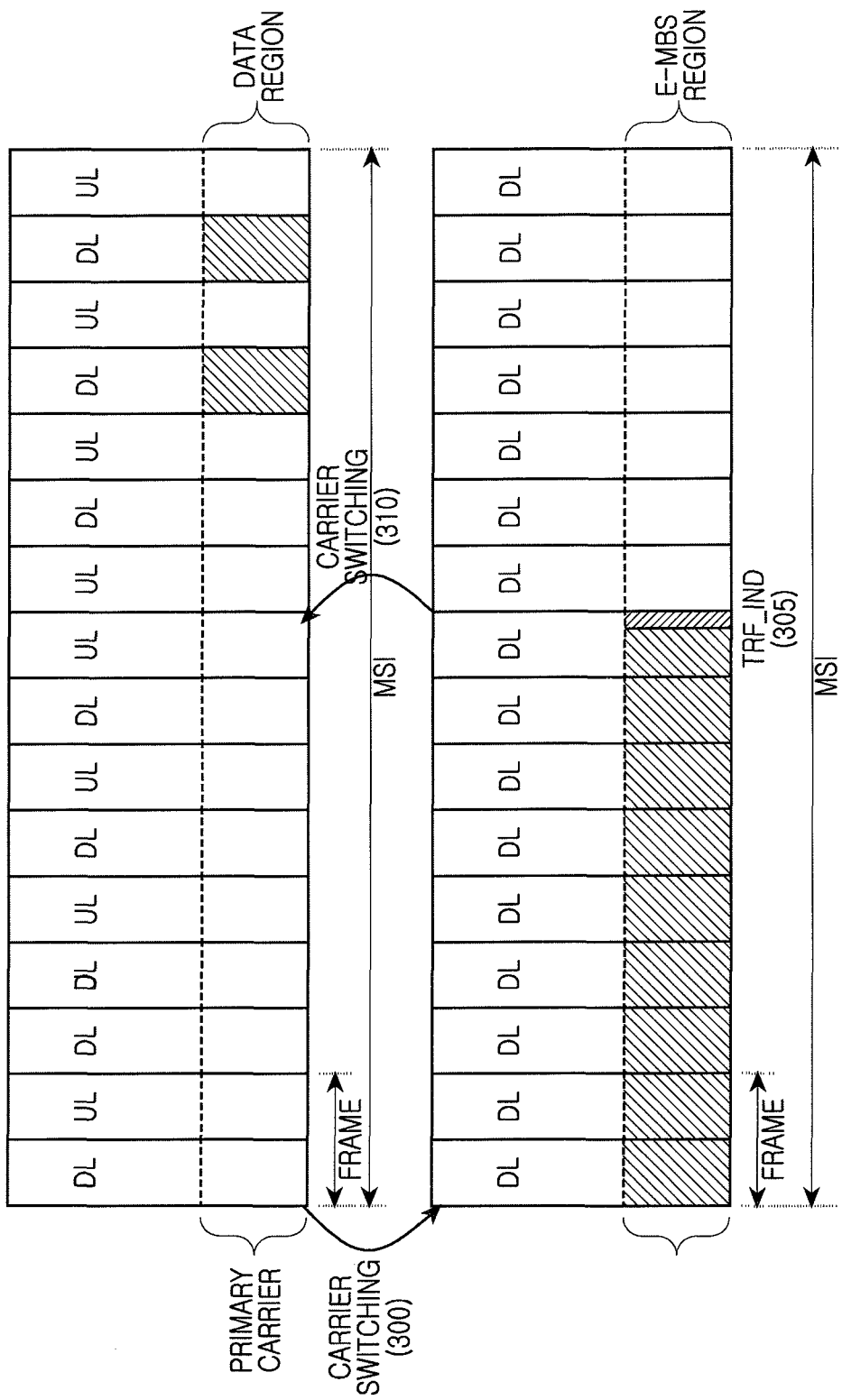
FIG. 3 illustrates a frame structure for transmitting a multicast message in a wireless communication system according to an exemplary embodiment of the present invention.

FIG. 3 illustrates a frame structure for transmitting a multicast message in a wireless communication system according to an exemplary embodiment of the present invention.

Referring to FIG. 3, like FIG. 2, the terminal 102 performs a network entry procedure with the serving base station 100 using the primary carrier to perform data communication, or operates in an idle mode or a sleep mode. E-MBS is performed only via the secondary carrier and only a downlink frame exists.

The terminal switches (300) from the primary carrier to the secondary carrier to perform E-MBS connection. The terminal inserts a Sleep ID (SLPID) into a DSx procedure proposed by the conventional standard to obtain E-MBS information and secondary carrier information. The terminal changes to a sleep mode while maintaining the connection based on the primary carrier, that is, without releasing the STID. The base station informs (305) the terminal that data to be received by the terminal via the primary carrier exists by transmitting AAI_TRF-IND to a specific frame (for example, a first frame where an E-MBS data burst is not transmitted).

The base station expresses a terminal managed by the base station using a bitmap within AAI_TRF-IND Zone of Table 3. When the position of the base station is '0', the base station expresses the absence of traffic, and when the position is '1', the base station expresses the presence of traffic. The position of the base station is determined using SLPID given through the primary carrier.

When communication data exists, the terminal switches to the primary carrier to perform (310) communication. When data to be received via the primary carrier does not exist, the terminal maintains E-MBS connection via the secondary carrier.

TABLE 3

| Syntax | Size (bits) | Notes |
| --- | --- | --- |
| AAI-TRF_IND Message format( ) | | |
| Control Message Type | 8 | MAC Control message type |
| SLPID Group Indication Bitmap | 32 | It indicates the existence of each SLPID group Nth bit of SLPID-Group Indication Bitmap [MSB corresponds to N = 0] is allocated to SLPID Group that includes AMS with SLPID values from N*32 to N*32 + 31 0: There is no traffic for any of the 32 AMSs that belong to the SLPID-Group 1: There is traffic for at least one AMS in SLPID Group. |
| Traffic indication bitmap | N*32 | It indicates the traffic indication for 32 AMSs in each SLPID group. Each Traffic Indication bitmap comprises multiples of 32-bit long Traffic Indication units. A Traffic Indication unit for 32 SLPIDs is added to AAI_TRF-IND message whenever its SLPID Group is set to 1 32 bits of Traffic Indication Unit (starting from MSB) are allocated to AMS in the ascending order of their SLPID values: 0: Negative indication 1: Positive indication |

Figure 4:
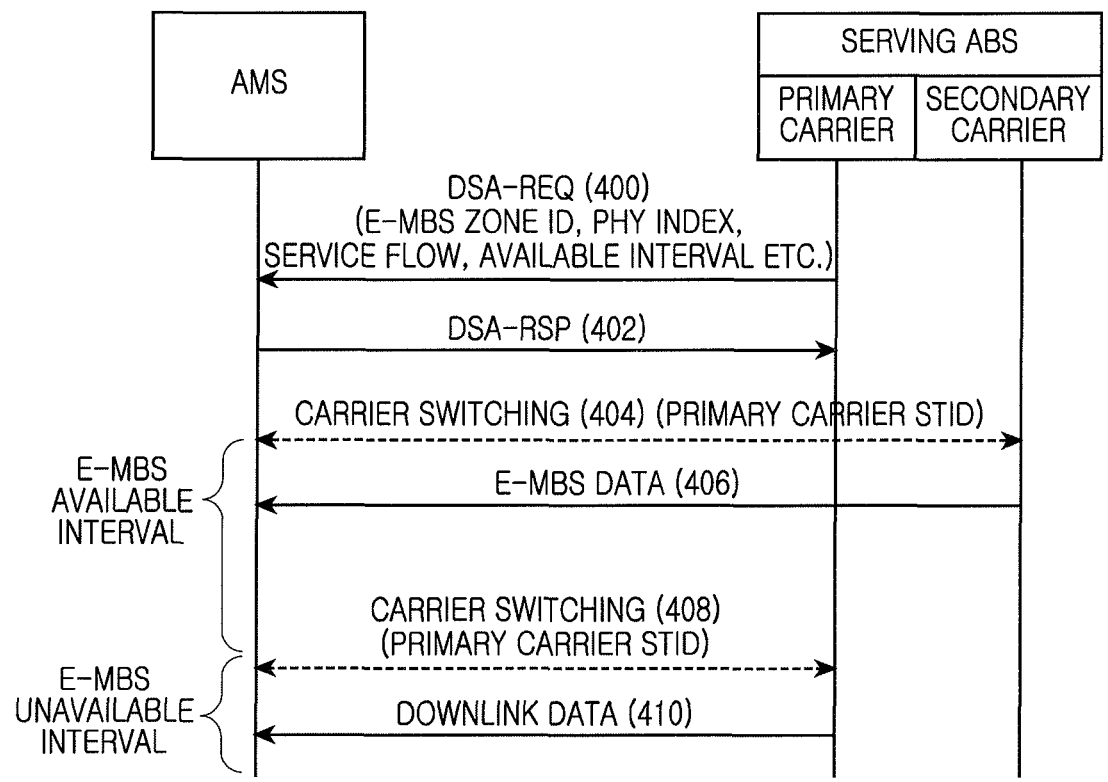
FIG. 4 illustrates a multicast message transmitting procedure in a wireless communication system according to an exemplary embodiment of the present invention.

FIG. 4 illustrates a view illustrating a multicast message transmitting procedure in a wireless communication system according to an exemplary embodiment of the present invention. In the wireless communication system, a terminal performs a network entry procedure based on a primary carrier to perform data communication or to be in a state that enables data communication.

Referring to FIG. 4, when the terminal transmits an E-MBS application message to a server (not shown) in order to start E-MBS connection, a serving base station transmits a DSA-REQ message to the terminal via the primary carrier in step 400. The DSA-REQ message includes E-MBS zone ID, E-MBS Service Flow Parameter, Physical Carrier Index, Carrier switching start time, and E-MBS/Unicast Available Interval (refer to Table 1).

The terminal determines E-MBS zone ID, E-MBS Service Flow Parameter, Physical Carrier Index, Carrier switching start time, E-MBS/Unicast Available Interval included in the DSA-REQ message via the primary carrier, and then transmits a DSA-RSP message of Table 2 to the serving base station in step 402. The DSA-RSP message includes a 'Confirmation Code' field (not shown in the DSA-RSP message format of Table 2). When the terminal does not want E-MBS, the 'Confirmation Code' field is set to 0x00. When the terminal desires to receive E-MBS, the 'Confirmation Code' field is set to 0x01.

When starting the E-MBS initially, the serving base station may transmit various E-MBS ID+FIDs set as a default to the terminal at a time. The serving base station sets several E-MBS service flow parameters designated as a default group service at a time, and this may be determined depending on a policy of a service provider.

The terminal and the serving base station switch from the primary carrier to the secondary carrier at Carrier switching start time to prepare to transmit/receive E-MBS data in step 404.

The serving base station multicasts E-MBS data via the secondary carrier during the E-MBS/Unicast Available Interval (or E-MBS Available Interval) and the terminal receives E-MBS data via the secondary carrier during the E-MBS/Unicast Available Interval in step 406.

When the E-MBS/Unicast Available Interval ends, the terminal and the serving base station switch from the secondary carrier to the primary carrier in step 408. The serving base station transmits downlink data to the terminal via the primary carrier during the Unicast Available Interval in step 410. The terminal may transmit uplink data to the serving base station via the primary carrier in step 410.

The terminal receives E-MBS data via the secondary carrier during the E-MBS Available Interval (that is, E-MBS/Unicast Available Interval) based on E-MBS ID+FID information provided via the primary carrier. In addition, when the E-MBS Available Interval ends, the terminal switches from the secondary carrier to the primary carrier to transmit/receive downlink/uplink data via the primary carrier during Unicast Available Interval.

Figure 10:
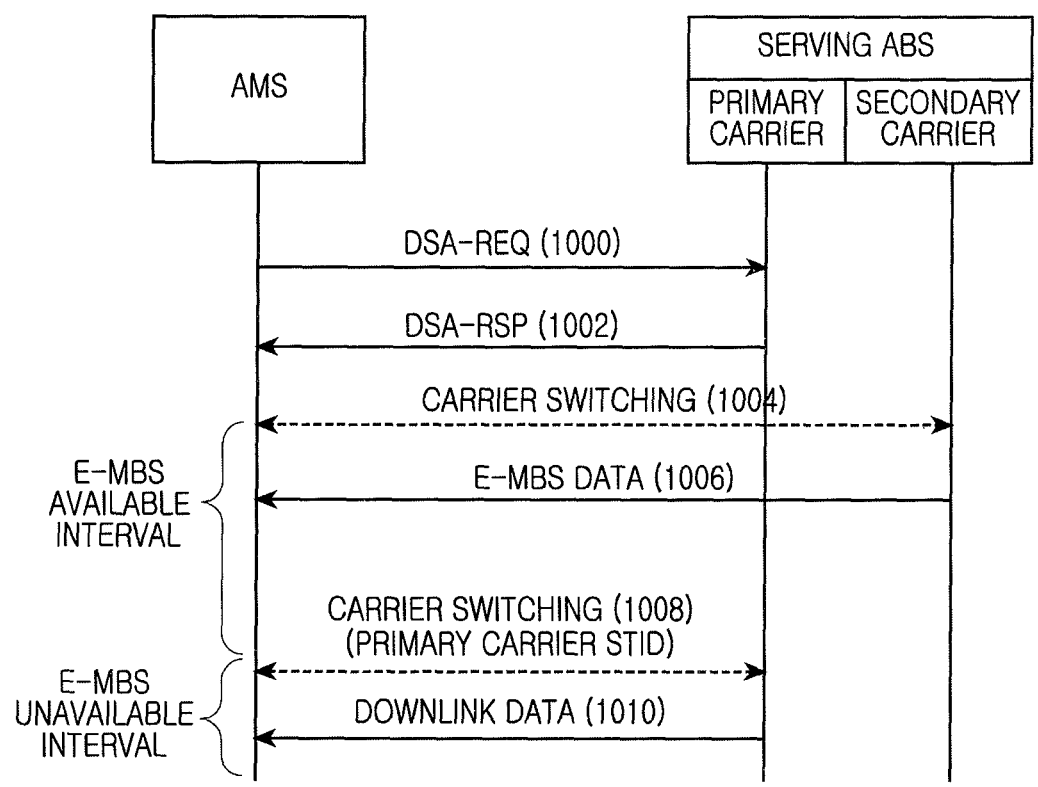
FIG. 10 illustrates a multicast message transmitting procedure in a wireless communication system according to an exemplary embodiment of the present invention.

Depending on realization, the terminal may transmit a DSA-REQ message to the base station, and receive a DSA-RSP message from the base station (refer to FIG. 10).

Figure 5:
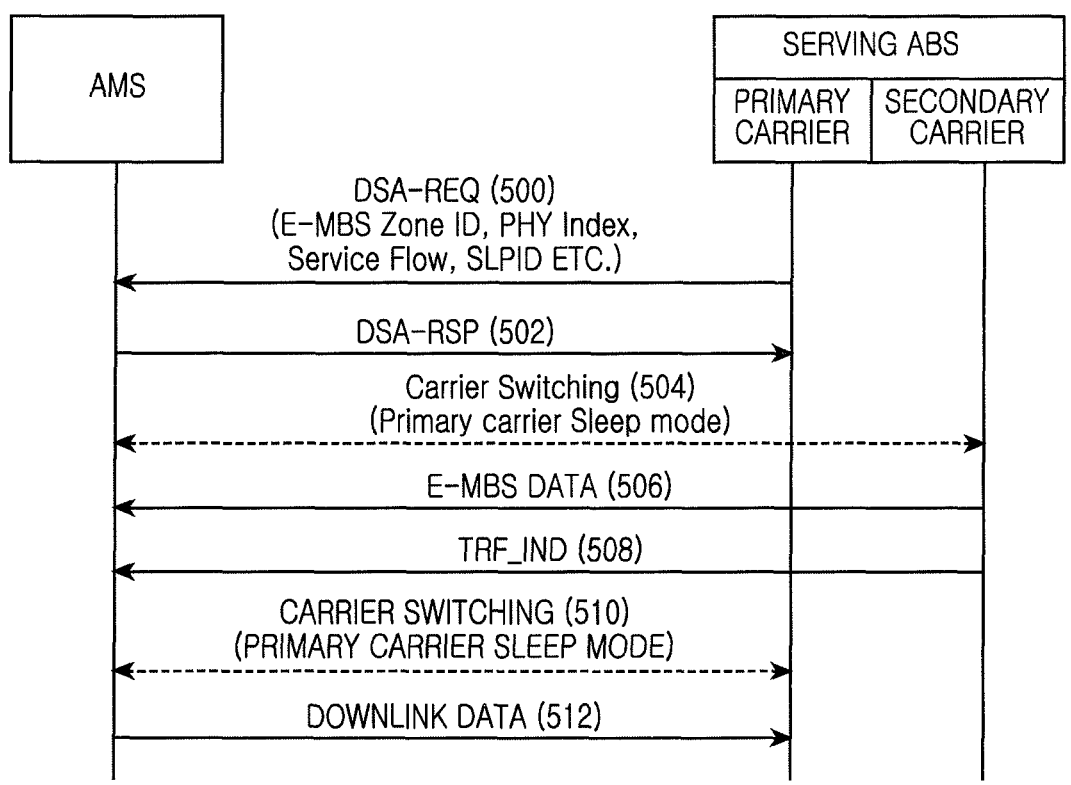
FIG. 5 illustrates a multicast message transmitting procedure in a wireless communication system according to an exemplary embodiment of the present invention.

FIG. 5 illustrates a multicast message transmitting procedure in a wireless communication system according to an exemplary embodiment of the present invention. In the wireless communication system, a terminal performs a network entry procedure based on a primary carrier to perform data communication or to be in a state that enables data communication.

Referring to FIG. 5, when the terminal transmits (not shown) an E-MBS application message to a server in order to start E-MBS connection, a serving base station transmits a DSA-REQ message to the terminal via the primary carrier in step 500. The DSA-REQ message includes an E-MBS zone ID, an E-MBS Service Flow Parameter, a Physical Carrier Index, a Carrier switching start time, an E-MBS/Unicast Available Interval, and an SLPID (refer to Table 1).

The terminal determines the E-MBS zone ID, the E-MBS Service Flow Parameter, the Physical Carrier Index, the Carrier switching start time, the E-MBS/Unicast Available Interval, and the SLPID included in the DSA-REQ message via the primary carrier, and transmits a DSA-RSP message of Table 2 to the serving base station in step 502. The DSA-RSP message includes a 'Confirmation Code' field (not shown in the DSA-RSP message format of Table 2). When the terminal does not want E-MBS, the 'Confirmation Code' field is set to 0x00. When the terminal desires to receive E-MBS, the 'Confirmation Code' field is set to 0x01.

The terminal and the serving base station switch from the primary carrier to the secondary carrier at Carrier switching start time to prepare to transmit/receive E-MBS data in step 504. At this point, the terminal operates in a sleep mode with respect to the primary carrier.

The serving base station multicasts E-MBS data via the secondary carrier and the terminal receives E-MBS data via the secondary carrier in step 506. The terminal receives E-MBS data via the secondary carrier based on E-MBS ID+FID information provided via the primary carrier.

When traffic to be transmitted via the primary carrier exists, the serving base station broadcasts AAI-TRF_IND in a predetermined frame or a subframe via an E-MBS channel (or the secondary carrier) in step 508. A position of the AAI-TRF_IND may differ depending on a service provider. For example, the AAI-TRF_IND may be positioned at the farthest end of MSI. Depending on realization, AAI-TRF_IND may be transmitted in a first frame through which an E-MBS data burst is not transmitted.

When data to be received via the primary carrier exists after receiving AAI-TRF_IND, the terminal switches from the secondary carrier to the primary carrier in step 510 and transmits downlink data using STID of the primary carrier in step 512.

When completing downlink data reception via the primary carrier, the terminal switches from the primary carrier to the secondary carrier without a separate control signal to continue to receive E-MBS data (not shown).

When E-MBS data to be received does not exist in step 508, the terminal that operates in a sleep mode with respect to the primary carrier switches to the primary carrier to transmit uplink data to the serving base station when the terminal has uplink data to be transmitted to the serving base station.

Depending on realization, the terminal may transmit a DSA-REQ message to the base station, and receive a DSA-RSP message from the base station (refer to FIG. 10).

Figure 6:
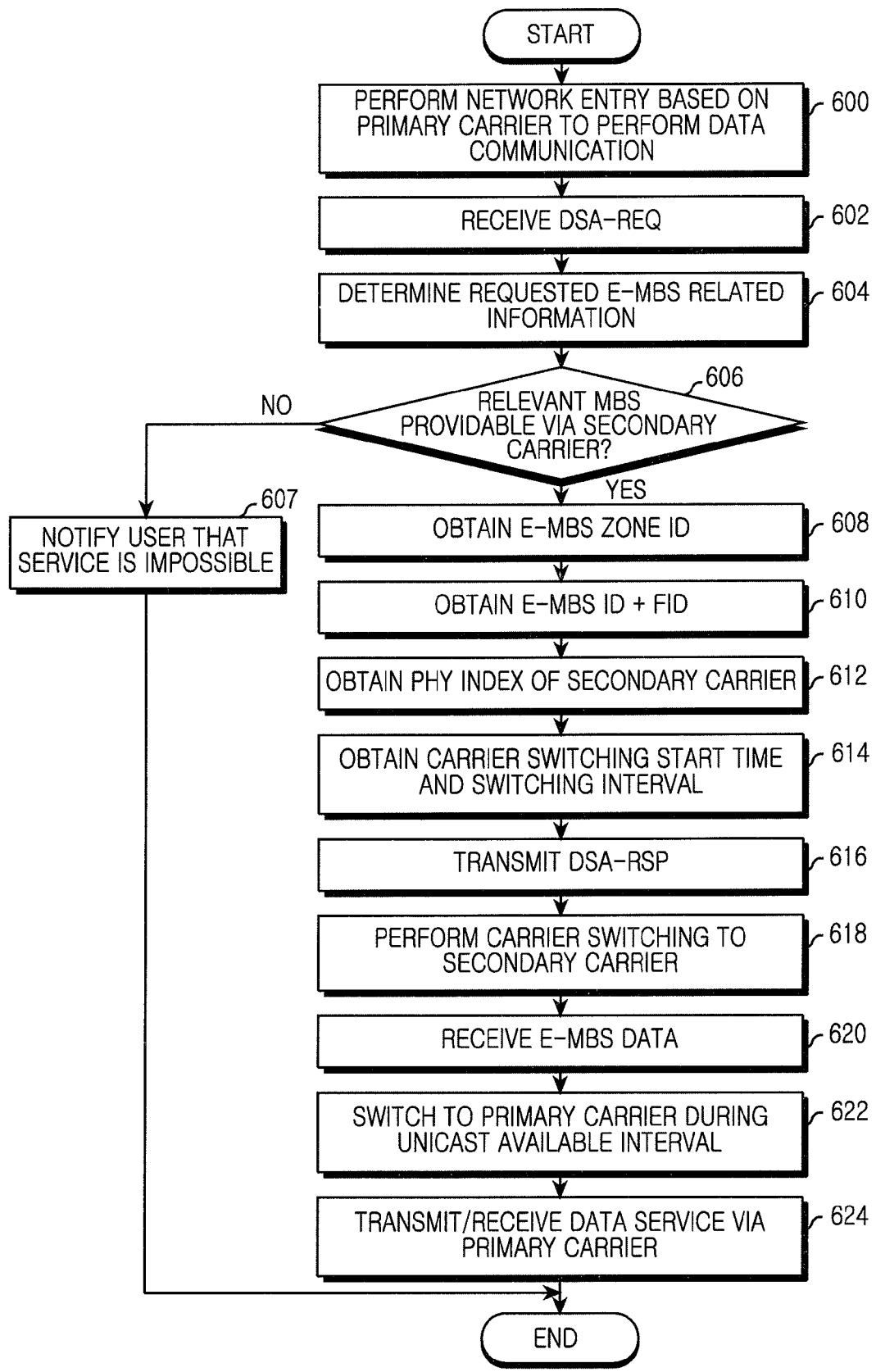
FIG. 6 illustrates a flowchart for operating a terminal for receiving a multicast message in a wireless communication system according to an exemplary embodiment of the present invention.

FIG. 6 illustrates a flowchart for operating a terminal for receiving a multicast message in a wireless communication system according to an exemplary embodiment of the present invention.

Referring to FIG. 6, the terminal performs a network entry procedure to perform data communication based on a primary carrier in step 600. The terminal transmits data to the base station via STID obtained during the network entry procedure.

When the terminal desires to receive E-MBS, the terminal transmits an E-MBS application message to an MBS server. The terminal receives a DSA-REQ message including an E-MBS zone ID, an E-MBS Service Flow Parameter, a Physical Carrier Index, a Carrier switching start time, and an E-MBS/Unicast Available Interval from the base station in step 602.

The terminal determines E-MBS related information included in the DSA-REQ message in step 604, and determines whether the E-MBS is possible via a secondary carrier for only MBS in step 606.

When the E-MBS is impossible via the secondary carrier for only the MBS in step 606, the terminal proceeds to step 607 to operate in a relevant mode. For example, the terminal notifies a user that E-MBS is impossible in the relevant mode.

When the E-MBS is possible via the secondary carrier for only the MBS in step 606, the terminal proceeds to step 608 to obtain the E-MBS zone ID. The terminal obtains the E-MBS ID+FID of MBS Service Flow Parameter in step 610, obtains the Physical Carrier Index of the secondary carrier in step 612, and obtains the carrier switching start time and the E-MBS/Unicast Available Interval in step 614. The terminal obtains the E-MBS zone ID, the E-MBS ID+FID, the physical carrier index of the secondary carrier, the carrier switching start time, and the E-MBS/Unicast Available Interval from the base station via the DSA-REQ message. When the terminal does not request a specific E-MBS channel at the base station, the terminal is allocated a plurality of E-MBS ID+FID designated as a default.

The terminal transmits a DSA-RSP message to the base station in response to the DSA-REQ message in step 616.

The terminal switches from the primary carrier to the secondary carrier at the carrier switching start time in step 618, and receives E-MBS data from the base station in step 620. The terminal receives E-MBS data during the E-MBS Available Interval using the secondary carrier based on the E-MBS ID+FID obtained via the primary carrier.

When the E-MBS Available Interval ends, the terminal switches from the secondary carrier to the primary carrier in step 622, and prepares to transmit/receive data via the primary carrier in step 624.

Figure 7:
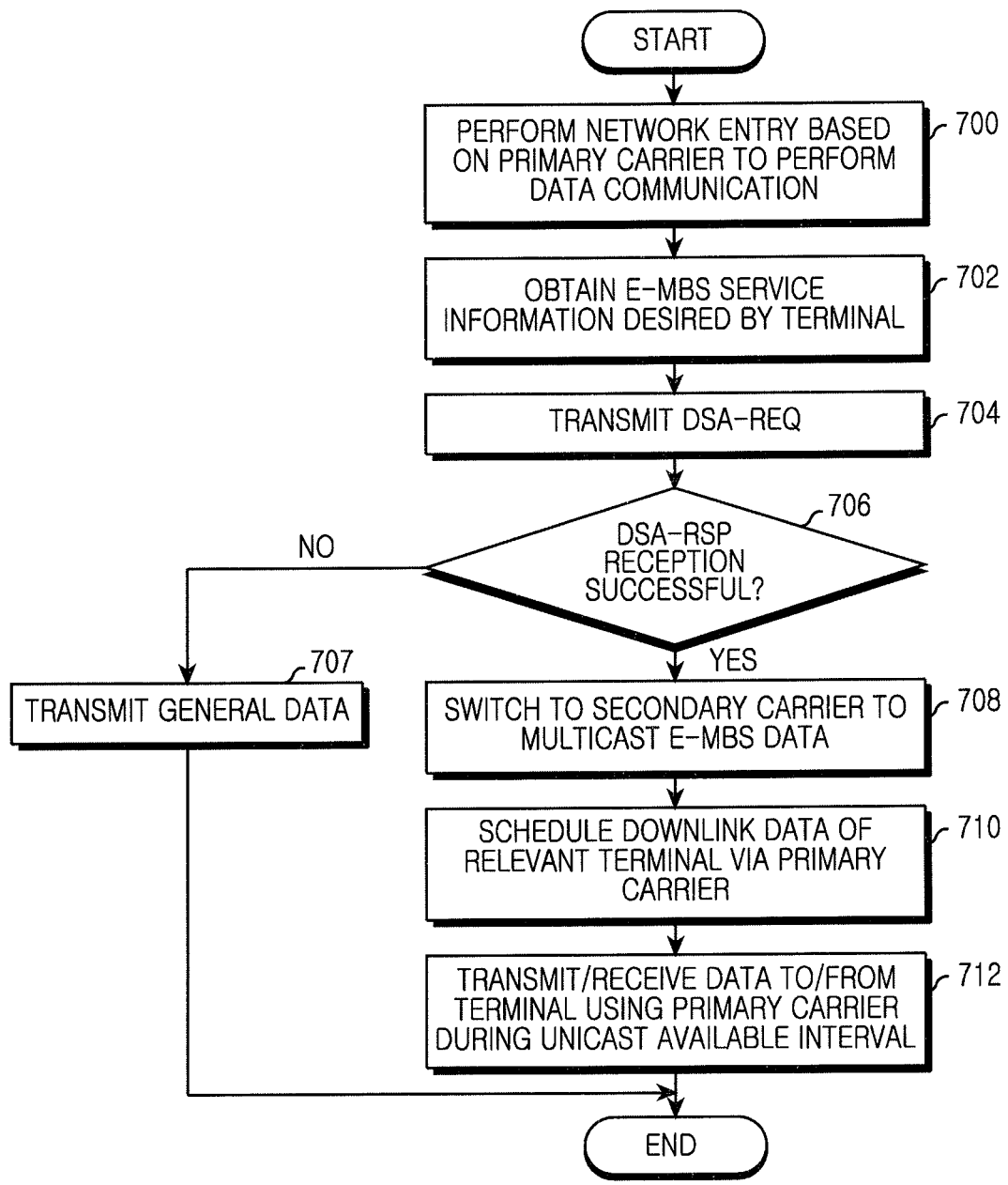
FIG. 7 illustrates a flowchart for operating a base station for receiving a multicast message in a wireless communication system according to an exemplary embodiment of the present invention.

FIG. 7 illustrates a flowchart for operating a base station for receiving a multicast message in a wireless communication system according to an exemplary embodiment of the present invention.

Referring to FIG. 7, the base station performs a network entry procedure with a terminal via a primary carrier to perform data communication with the terminal in step 700.

The base station triggers an E-MBS message or recognizes that the terminal requests E-MBS via an MBS server to determine an E-MBS service flow desired by the terminal, that is, related E-MBS service information together with E-MBS ID+FID information in step 702.

The base station transmits a DSA-REQ message including E-MBS zone ID, an E-MBS Service Flow Parameter, a Physical Carrier Index, a Carrier switching start time, and an E-MBS/Unicast Available Interval to the terminal via the primary carrier in step 704.

The base station receives a DSA-RSP message via the primary carrier in response to a DSA-REQ message and determines whether to provide E-MBS to the terminal based on the DSA-RSP message in step 706.

When E-MBS cannot be provided to the terminal via the secondary carrier in step 706, the base station proceeds to step 707 to continue to perform general data communication via the primary carrier.

When E-MBS can be provided to the terminal via the secondary carrier in step 706, the base station proceeds to step 708 to switch from the primary carrier to the secondary carrier and multicast E-MBS data to the terminal during the E-MBS Available Interval.

When the E-MBS Available Interval ends, the base station schedules downlink data to be transmitted to the terminal via the primary carrier during Unicast Available Interval in step 710. The base station may schedule uplink data of the terminal.

The base station transmits/receives data via the primary carrier during Unicast Available Interval in step 712.

Figure 8:
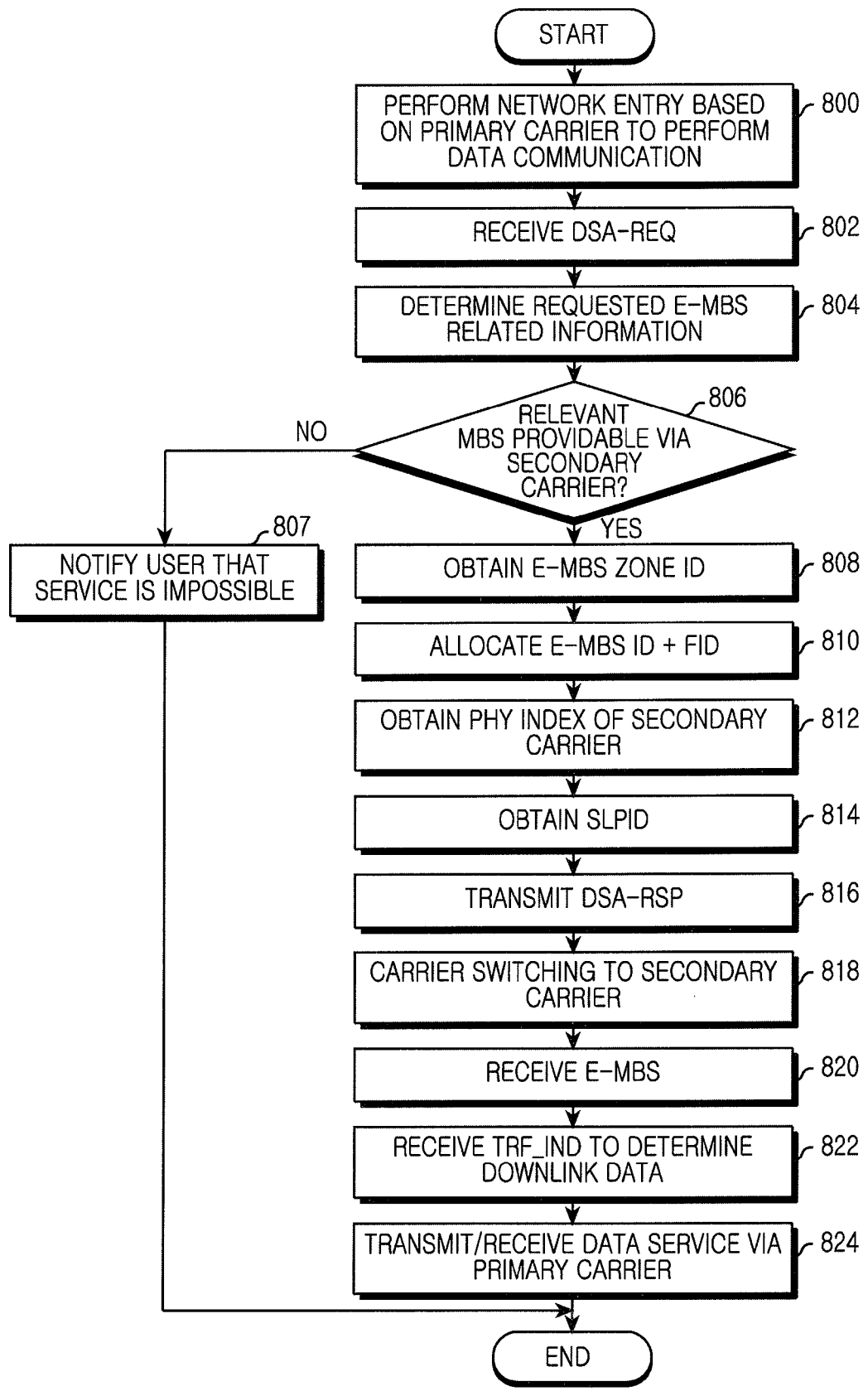
FIG. 8 illustrates a flowchart for operating a terminal for receiving a multicast message in a wireless communication system according to an exemplary embodiment of the present invention.

FIG. 8 illustrates a flowchart for operating a terminal for receiving a multicast message in a wireless communication system according to an exemplary embodiment of the present invention.

Referring to FIG. 8, the terminal performs a network entry procedure based on a primary carrier to perform data communication in step 800. The terminal transmits data to a base station via an STID obtained during the network entry procedure.

When the terminal desires to receive E-MBS, the terminal transmits an E-MBS application message to an MBS server and receives a DSA-REQ message including an E-MBS zone ID, an E-MBS Service Flow Parameter, a Physical Carrier Index, a Carrier switching start time, an E-MBS/Unicast Available Interval, and an SLPID from the base station in step 802.

The terminal determines E-MBS related information included in the DSA-REQ message in step 804 and determines whether E-MBS can be provided via a secondary carrier for only MBS in step 806.

When E-MBS cannot be provided via the secondary carrier for only MBS in step 806, the terminal proceeds to step 807 to operate in a relevant mode. For example, the terminal notifies a user that E-MBS is impossible in the relevant mode.

When E-MBS can be provided via the secondary carrier for only MBS in step 806, the terminal proceeds to step 808 to obtain an E-MBS zone ID, and obtains an E-MBS ID+FID of MBS Service Flow Parameter in step 810. The terminal obtains a Physical Carrier Index of the secondary carrier in step 812, and obtains an SLPID, a Carrier switching start time, and an E-MBS/Unicast Available Interval in step 814. The terminal obtains the E-MBS zone ID, the E-MBS ID+FID, the Physical Carrier Index of the secondary carrier, the carrier switching start time, the E-MBS/Unicast Available Interval, and the SLPID from the base station via the DSA-REQ message. When the terminal does not request a specific E-MBS channel at the base station, the terminal is allocated a plurality of E-MBS ID+FID designated as a default.

The terminal transmits a DSA-RSP message to the base station in response to the DSA-REQ message in step 816.

The terminal switches from the primary carrier to the secondary carrier in step 818 and receives E-MBS data from the base station in step 820. The terminal receives E-MBS data using the secondary carrier based on E-MBS ID+FID obtained via the primary carrier.

The terminal receives the TRF_IND via a predetermined frame or subframe based on the secondary carrier to determine downlink data via the primary carrier from the base station in step 822.

When downlink data transmission via the primary carrier exists, the terminal switches from the secondary carrier to the primary carrier to receive downlink data in step 824.

Figure 9:
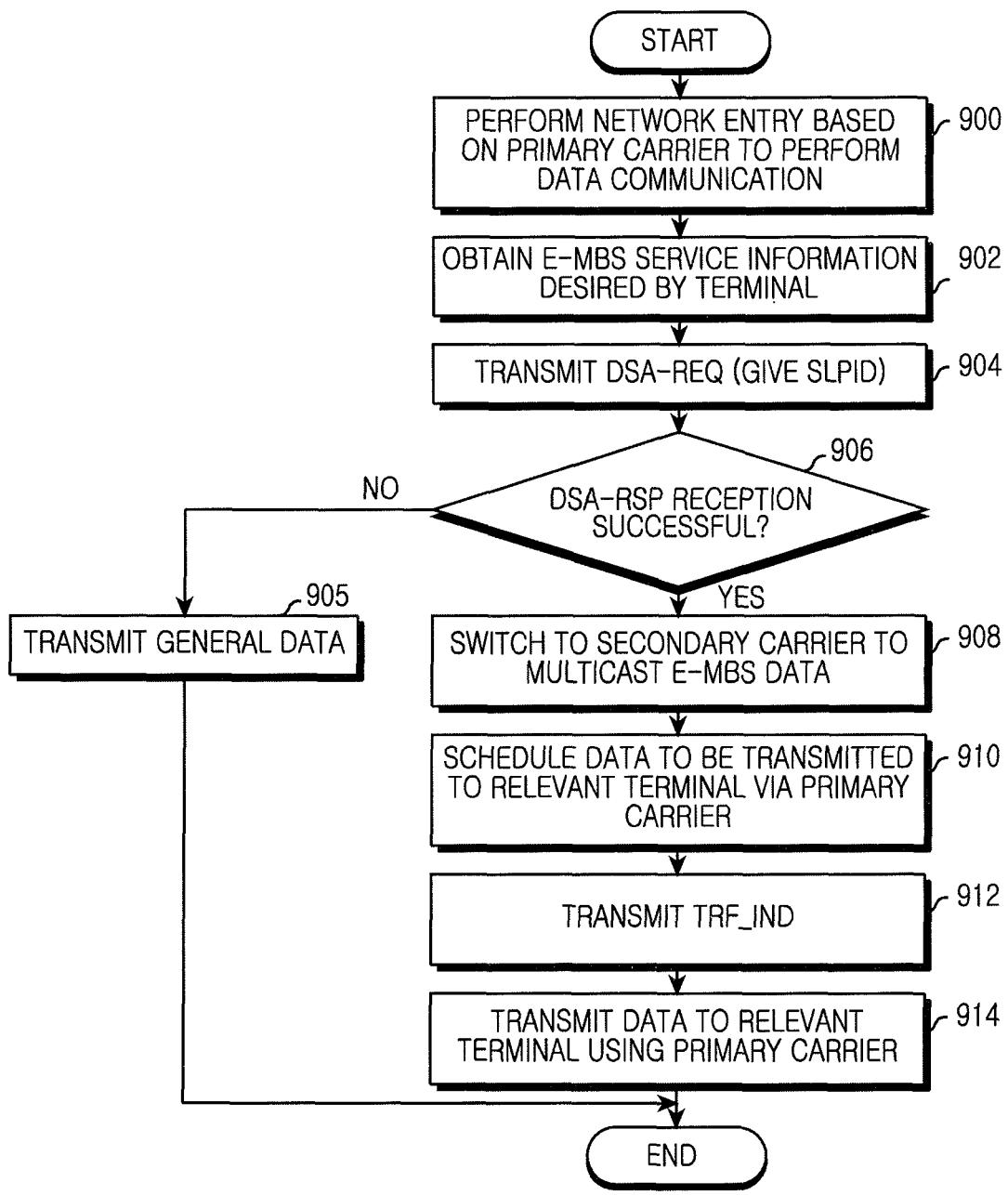
FIG. 9 illustrates a flowchart for operating a base station for receiving a multicast message in a wireless communication system according to an exemplary embodiment of the present invention.

FIG. 9 illustrates a flowchart for operating a base station for receiving a multicast message in a wireless communication system according to an exemplary embodiment of the present invention.

Referring to FIG. 9, the base station performs a network entry procedure with a terminal via a primary carrier to perform data communication with the terminal in step 900.

The base station triggers an E-MBS message or recognizes that the terminal requests E-MBS via an MBS server to determine an E-MBS service flow desired by the terminal, that is, related E-MBS service information together with E-MBS ID+FID information in step 902.

The base station transmits a DSA-REQ message including an E-MBS zone ID, an E-MBS Service Flow Parameter, a Physical Carrier Index, a Carrier switching start time, an E-MBS/Unicast Available Interval, and an SLPID to the terminal via the primary carrier in step 904.

The base station receives a DSA-RSP message via the primary carrier in response to a DSA-REQ message and determines whether to provide E-MBS to the terminal based on the DSA-RSP message in step 906.

When E-MBS cannot be provided to the terminal via the secondary carrier in step 906, the base station proceeds to step 905 to continue to perform the general data communication via the primary carrier.

In contrast, when E-MBS can be provided to the terminal via the secondary carrier in step 906, the base station proceeds to step 908 to switch from the primary carrier to the secondary carrier and multicast E-MBS data to the terminal.

The base station schedules downlink data to be transmitted to the terminal via the primary carrier in step 910. The base station may schedule uplink data of the terminal.

The base station transmits TRF_IND to the terminal via the secondary carrier during a specific frame or subframe in step 912.

The base station transmits data via the primary carrier in step 914.

FIG. 10 illustrates a multicast message transmitting procedure in a wireless communication system according to an exemplary embodiment of the present invention. In the wireless communication system, the terminal performs a network entry procedure based on the primary carrier to perform data communication or to be in a state that enables data communication.

Referring to FIG. 10, the terminal transmits a DSA-REQ message to a base station in order to start E-MBS service connection in step 1000. The DSA-REQ message includes an E-MBS zone ID, an E-MBS Service Flow Parameter, and a Physical Carrier Index (refer to Table 1). When the terminal transmits the DSA-REQ message to the base station, Carrier switching start time and E-MBS/Unicast Available Interval information are not transmitted.

The base station transmits the DSA-RSP message to the terminal via the primary carrier in response to the DSA-REQ message in step 1002. The DSA-RSP message includes the E-MBS zone ID, the E-MBS Service Flow Parameter, the Physical Carrier Index, the Carrier switching start time, and the E-MBS/Unicast Available Interval. In addition, the DSA-REQ message includes a 'Confirmation Code' field (not shown in the DSA-RSP message format of Table 2). When the terminal does not want E-MBS, the 'Confirmation Code' field is set to 0x00. When the terminal desires to receive E-MBS, the 'Confirmation Code' field is set to 0x01.

The terminal and the serving base station switch from the primary carrier to a secondary carrier at the Carrier switching start time to prepare to transmit/receive E-MBS data in step 1004.

The serving base station multicasts E-MBS data via the secondary carrier during the E-MBS/Unicast Available Interval, and the terminal receives E-MBS data via the secondary carrier during the E-MBS/Unicast Available Interval in step 1006.

When the E-MBS/Unicast Available Interval ends, the terminal and the serving base station switches from the secondary carrier to the primary carrier in step 1008, and the serving base station transmits downlink data to the terminal via the primary carrier in step 1010. The terminal may transmit uplink data to the serving base station via the primary carrier in step 1010.

The terminal receives E-MBS data via the secondary carrier during the E-MBS Available Interval based on the E-MBS ID+FID information provided via the primary carrier. In addition, when the E-MBS Available Interval ends, the terminal switches from the secondary carrier to the primary carrier and transmits/receives downlink/uplink data via the primary carrier during the Unicast Available Interval.

Figure 11:
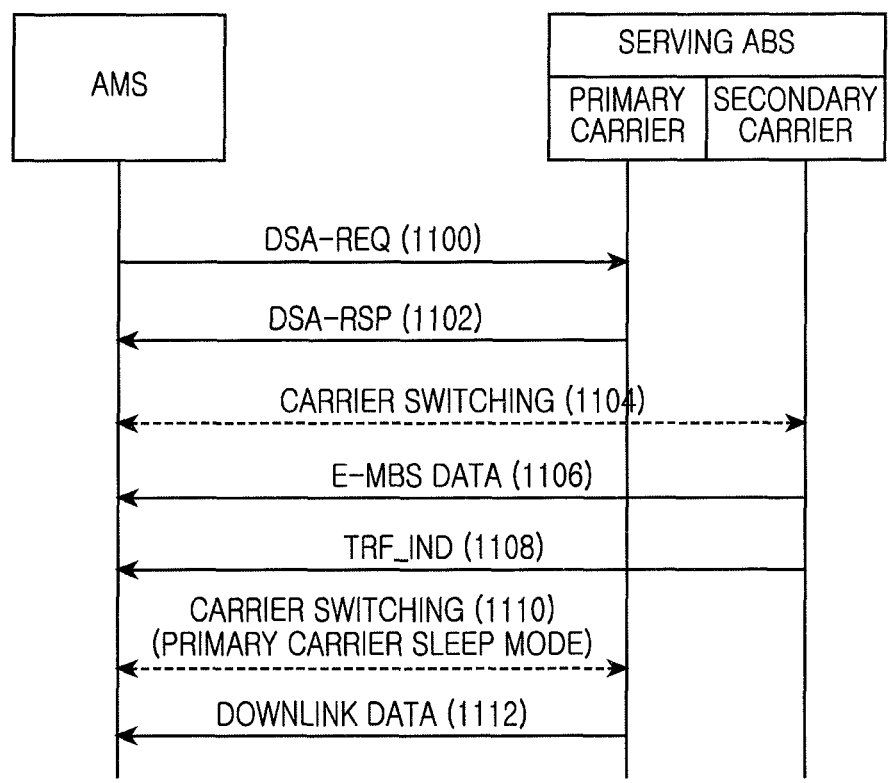
FIG. 11 illustrates a multicast message transmitting procedure in a wireless communication system according to an exemplary embodiment of the present invention.

FIG. 11 illustrates a multicast message transmitting procedure in a wireless communication system according to an exemplary embodiment of the present invention. In the wireless communication system, a terminal performs a network entry procedure based on a primary carrier to perform data communication or to be in a state that enables data communication.

Referring to FIG. 11, the terminal transmits a DSA-REQ message to a base station via the primary carrier in order to start E-MBS service connection in step 1100. The DSA-REQ message includes an E-MBS zone ID, an E-MBS Service Flow Parameter, and a Physical Carrier Index (refer to Table 1). Carrier switching start time, E-MBS/Unicast Available Interval, and SLPID information are not included in the DSA-REQ message.

The base station transmits a DSA-RSP message of Table 2 to the serving base station via the primary carrier in step 1102. The DSA-RSP message includes the E-MBS zone ID, the E-MBS Service Flow Parameter, and Physical Carrier Index, Carrier switching start time, E-MBS/Unicast Available Interval, and SLPID included in the DSA-REQ message. In addition, the DSA-REQ message includes a 'Confirmation Code' field (not shown in the DSA-RSP message format of Table 2). When the terminal does not want E-MBS, the 'Confirmation Code' field is set to 0x00. When the terminal desires to receive E-MBS, the 'Confirmation Code' field is set to 0x01.

The terminal and the base station switch from the primary carrier to the secondary carrier at Carrier switching start time to prepare to transmit/receive E-MBS data in step 1104. At this point, the terminal operates in a sleep mode with respect to the primary carrier.

The serving base station multicasts E-MBS data via the secondary carrier during the E-MBS/Unicast Available Interval. The terminal receives E-MBS data via the secondary carrier during the E-MBS/Unicast Available Interval in step 1106. The terminal receives E-MBS data via the secondary carrier during the E-MBS Available Interval (or the E-MBS/Unicast Available Interval) based on E-MBS ID+FID provided via the primary carrier.

The serving base station broadcasts the AAI-TRF_IND via a predetermined frame or subframe via an E-MBS channel (or the secondary carrier) in step 1108. The position of the AAI-TRF_IND may differ depending on a service provider. For example, the AAI-TRF_IND may be positioned at the farthest end of MSI.

When data to be received via the primary carrier exists after receiving AAI-TRF_IND, the terminal switches from the secondary carrier to the primary carrier in step 1110, and transmits downlink data using the STID of the primary carrier in step 1112.

When completing downlink data reception via the primary carrier, the terminal switches from the primary carrier to the secondary carrier without a separate control signal to continue to receive E-MBS data.

According to an exemplary embodiment of the present invention, when the E-MBS/Unicast Available Interval ends in step 508 (i.e., E-MBS data to be received does not exist), the terminal that operates in a sleep mode with respect to the primary carrier switches to the primary carrier to transmit uplink data to the serving base station when the uplink data to be transmitted to the serving base station exists.

After the E-MBS/Unicast Available Interval ends, when uplink or downlink data to be transmitted does not exist, the terminal and the serving base station continues to maintain an E-MBS service connection via the secondary carrier in step 1108.

Figure 12:
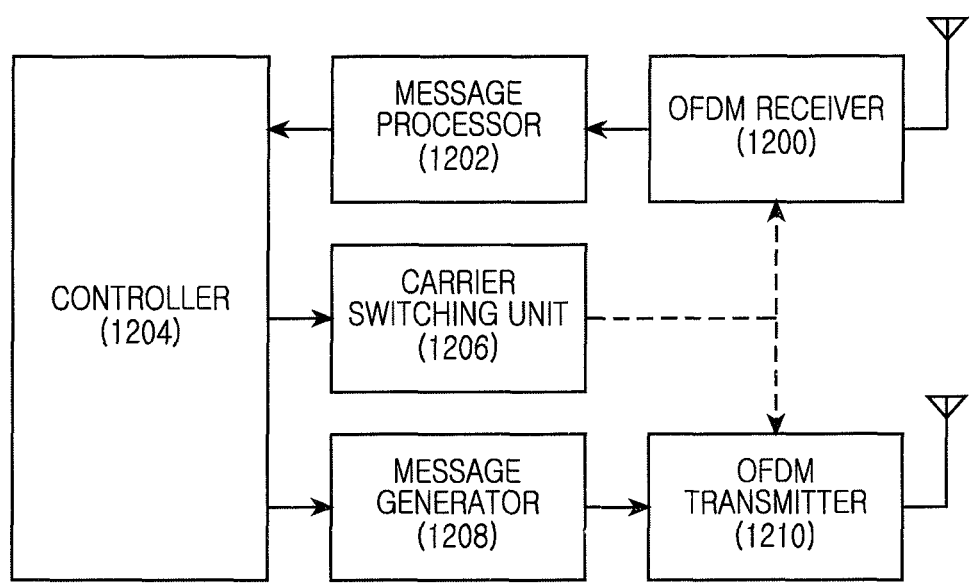
FIG. 12 illustrates a block diagram illustrating an apparatus for transmitting a multicast message in a wireless communication system according to an exemplary embodiment of the present invention.

FIG. 12 illustrates a block diagram illustrating an apparatus for transmitting a multicast message in a wireless communication system according to an exemplary embodiment of the present invention. The apparatus may be a base station or a terminal.

Referring to FIG. 12, the apparatus for transmitting the multicast message includes an OFDM receiver 1200, a message processor 1202, a controller 1204, a carrier switching unit 1206, a message generator 1208, and an OFDM transmitter 1210. According to an exemplary embodiment of the present invention, the apparatus may include additional and/or different units. Similarly, the functionality of two or more of the above units may be integrated into a single component. While the apparatus as a whole is intended to be a physical device, one or more of the units may be implemented entirely or partially as software components. Similarly, it would be understood that some of the units would need to be implemented at least partially as hardware components in order to carry out their functions.

The OFDM receiver 1200 down-converts an RF signal received via an antenna to a baseband signal, divides the baseband signal on an OFDM symbol basis, removes a CP, and recovers complex symbols mapped to a frequency domain by performing Fast Fourier Transform (FFT). In addition, the OFDM receiver 1200 classifies complex symbols mapped to the frequency domain on a process basis. For example, the OFDM receiver 1200 extracts a preamble signal and a pilot signal used for channel quality measurement, and extracts a control message signal to provide the same to the message processor 1202.

The message processor 1202 reads a received control message. The message processor 1202 determines the kind of a received control message and information included in the control message. For example, the message processor 1202 determines information included in an AAI_REG_REQ/AAI_REG_RSP message, AAI_DSA-REQ and AAI_DSA-RSP messages, and an AAI_E-MBS-CFG message, and provides the information to the controller 1204. In addition, the message processor 1202 reads an E-MBS service frame to provide E-MBS data to the controller 1204.

The controller 1204 controls an overall function for communication performance of the base station and the terminal, and E-MBS. Based on information obtained from a DSX message proposed by an exemplary embodiment of the present invention, when a system is changed (in case of switching from a primary carrier to a secondary carrier, or in case of switching from the secondary carrier to the primary carrier), the controller 1204 performs a physical control function required for change between an existing system and a new system.

The controller 1204 performs a network entry procedure based on the primary carrier to perform data communication. To start E-MBS service connection, the controller 1204 transmits a DSA-REQ message. The DSA-REQ message includes an E-MBS zone ID, an E-MBS Service Flow Parameter, a Physical Carrier Index, a Carrier switching start time, and an E-MBS/Unicast Available Interval.

The controller 1204 determines the E-MBS zone ID, the E-MBS Service Flow Parameter, the Physical Carrier Index, the Carrier switching start time, and the E-MBS/Unicast Available Interval included in the DSA-REQ message, and then transmits a DSA-RSP message of Table 2. The DSA-RSP message includes a 'Confirmation Code' field (not shown in the DSA-RSP message format of Table 2). When the terminal does not want E-MBS, the 'Confirmation Code' field is set to 0x00. When the terminal desires to receive E-MBS, the 'Confirmation Code' field is set to 0x01.

The carrier switching unit 1206 transmits a command to the OFDM receiver 1200 and the OFDM transmitter 1210 so that they switch from the primary carrier to the secondary carrier at the Carrier switching start time under control of the controller 1204. The controller 1204 multicasts E-MBS data and receives E-MBS data during the E-MBS/Unicast Available Interval (or E-MBS Available Interval) via the secondary carrier. When the E-MBS/Unicast Available Interval ends, the carrier switching unit 1206 switches from the secondary carrier to the primary carrier, and allows the OFDM transmitter 1210 to transmit downlink data via the primary carrier during Unicast Available Interval.

The controller 1204 transmits a DSA-REQ message to the terminal via the primary carrier. The DSA-REQ message includes the E-MBS zone ID, the E-MBS Service Flow Parameter, the Physical Carrier Index, the Carrier switching start time, the E-MBS/Unicast Available Interval, and the SLPID (refer to Table 1).

The controller 1204 determines the E-MBS zone ID, the E-MBS Service Flow Parameter, the Physical Carrier Index, the Carrier switching start time, the E-MBS/Unicast Available Interval, and the SLPID included in the DSA-REQ message, and then transmits a DSA-RSP message of Table 2 via the primary carrier.

The carrier switching unit 1206 transmits a command to the OFDM receiver 1200 and the OFDM transmitter 1210 so that they switch from the primary carrier to the secondary carrier at the Carrier switching start time under control of the controller 1204.

The controller 1204 multicasts E-MBS data via the secondary carrier and receives E-MBS data via the secondary carrier. The terminal receives E-MBS data via the secondary carrier based on E-MBS ID+FID provided via the primary carrier.

When traffic to be transmitted via the primary carrier exists, the controller 1204 broadcasts the AAI-TRF_IND via a predetermined frame or subframe via an E-MBS channel (or the secondary carrier). The position of the AAI-TRF_IND may differ depending on a service provider. For example, the AAI-TRF_IND may be positioned at the farthest end of MSI. Depending on realization, AAI-TRF_IND may be transmitted via a first frame through which an E-MBS data burst is not transmitted.

After receiving the AAI-TRF_IND, when data to be received via the primary carrier exists, the carrier switching unit 1206 switches from the secondary carrier to the primary carrier to allow the OFDM transmitter 1210 to transmit downlink data.

When completing downlink data reception via the primary carrier, the carrier switching unit 1206 switches from the primary carrier to the secondary carrier without a separate control signal to allow the OFDM receiver 1200 to receive E-MBS data.

The message generator 1006 receives data and control information from the controller 1204 to generate a message. For example, the message generator 1006 generates information to be included in an AAI_REG_REQ/AAI_REG_RSP message, AAI_DSA-REQ and AAI_DSA-RSP messages, and an AAI_E-MBS-CFG message, and provides the same to the OFDM transmitter 1210. In addition, the message generator 1006 provides E-MBS data to be included in an E-MBS service frame to the transmitter 1210. In addition, the message generator 1006 generates an E-MBS data burst.

The OFDM transmitter 1210 maps complex symbols forming a preamble signal and an E-MBS frame to a frequency domain according to a predetermined rule, converts the complex symbols mapped to the frequency domain into a signal in a time domain by performing Inverse Fast Fourier Transform (IFFT), and inserts a CP (Cyclic Prefix), thereby configuring an OFDM symbol. In addition, the OFDM transmitter 1210 up-converts the OFDM symbol into an RF signal, and then transmits the same via the antenna.

Figure 13:
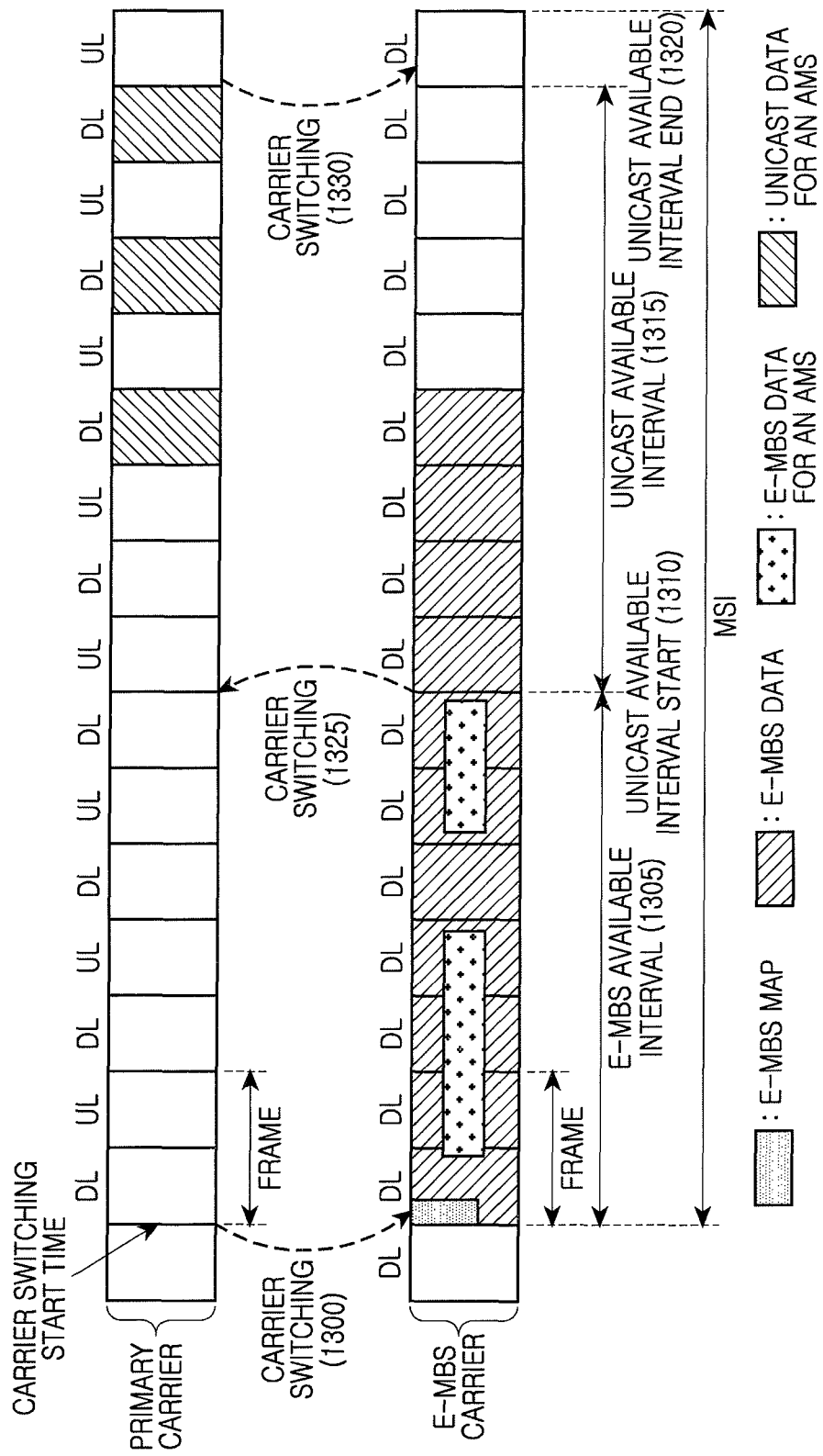
FIG. 13 illustrates a frame structure for transmitting a multicast message in a wireless communication system according to an exemplary embodiment of the present invention.

FIG. 13 illustrates a frame structure for transmitting a multicast message in a wireless communication system according to an exemplary embodiment of the present invention.

Referring to FIG. 13, a terminal 102 performs a network entry procedure with a serving base station 100 using a primary carrier. E-MBS is performed only via the secondary carrier, and only a downlink frame exists.

The downlink frame may be divided into the E-MBS Available Interval 1305 and the Unicast Available Interval 1315 during the E-MBS Scheduling Interval (MSI). The E-MBS Available Interval 1305 is a section in which an E-MBS data burst is transmitted, and the Unicast Available Interval 1315 is a section in which an E-MBS data burst is not transmitted.

The E-MBS Available Interval 1305 may be defined as a free E-MBS section, and the Unicast Available Interval 1315 may be defined as a charged E-MBS section. Though the E-MBS Available interval 1305 may be divided into the free E-MBS section and the charged E-MBS section as shown, the E-MBS Available Interval 1305 may also be divided by defining two or more categories depending on exemplary embodiments. For example, the category may be divided depending on a service rate of a subscriber terminal, and the E-MBS Available interval 1305 may be determined depending on a service rate. Defining the E-MBS Available interval 1305 provides available E-MBS channels to the terminal 102 by default when the terminal 102 starts E-MBS via the secondary carrier initially. The terminal 102 switches to the secondary carrier and then may receive an E-MBS channel broadcast during the E-MBS Available Interval 210.

The terminal 102 that has completed network entry based on the primary carrier should switch (200) to the secondary carrier through an MBS negotiation procedure with the serving base station 100 in order to connect to E-MBS and receive the E-MBS, separately from the connection based on the primary carrier. In addition, while receiving the E-MBS using the secondary carrier, the terminal 102 switches from the secondary carrier to the primary carrier to receive downlink data via the primary carrier during a section via which E-MBS data is not transmitted or a section undesired E-MBS data is transmitted even when the E-MBS data is transmitted. Depending on realization, the terminal 102 may switch (230) from the secondary carrier to the primary carrier to transmit uplink data, and may switch to the primary carrier during the Unicast Available interval 240 to receive unicast data.

The terminal 102 that has completed network entry based on the primary carrier may switch (1300) to the secondary carrier through an MBS negotiation procedure with the serving base station 100 in order to connect to E-MBS and receive the E-MBS, separately from the connection based on the primary carrier. In addition, while receiving the E-MBS using the secondary carrier, the terminal 102 switches (1325) from the secondary carrier to the primary carrier to receive downlink data via the primary carrier during a section via which E-MBS data is not transmitted or a section undesired E-MBS data is transmitted even when the E-MBS data is transmitted. Depending on realization, the terminal 102 may switch (230) from the secondary carrier to the primary carrier to transmit uplink data.

For this purpose, an exemplary embodiment of the present invention provides information required for switching from the primary carrier to the secondary carrier through connection based on the primary carrier using AAI_DSA-REQ and AAI_DSA-RSP as in Table 4 and Table 5. Here, AAI_DSA-REQ may be started by a base station or a terminal

TABLE 4

| Syntax | Size (bits) | Notes |
| --- | --- | --- |
| AAI-DSA_REQ Message format( ) | | |
| Control Message Type | 8 | |
| FID Change Count | 4 | The change count of this transaction assigned by the sender. If a new transaction is started, FID Change Count is incremented by one (modulo 16) by the sender. |
| Uplink/Downlink Indicator | 1 | 0: uplink; 1: downlink |
| QoS parameter set type | 8 | Bit 0: Provisioned Set Bit 1: Admitted Set Bit 2: Active Set |
| Service Flow Parameters | TBD | The number of included AMBS DATA IEs |
| Convergence Sublayer Parameter Encoding | TBD | |
| E-MBS Service | 12 | Indicates whether the MBS service being requested or provided for the connection that is being setup. 0: No available E-MBS 1: E-MBS in Serving ABS Only 2: E-MBS in a multi-ABS Zone supporting macro-diversity 3: E-MBS in a multi-ABS Zone no supporting macro-diversity |
| E-MBS Zone ID | 7 | Indicates an E-MBS zone where the connection for associated service flow is valid. |
| E-MBS Service Flow Parameter | variable | Mapping of E-MBS ID and FID |
| Physical Carrier Index | 6 | Target carrier which the AMS switches or is redirected by ABS to, only included in |

TABLE 4-continued

| Syntax | Size (bits) | Notes |
| --- | --- | --- |
| | | ABS initiated DSA-REQ |
| Carrier switching start time | TBD | TBD LSB bits of Superframe numbers at carrier switching start time |
| Unicast Available Interval Start | variable | In unit of frames where n is Number of Unicast Available Intervals. The AMS stays at primary carrier from Unicast Available Interval Start to Unicast Available Interval End. MSI length == 0b00: 3 * n bits MSI length == 0b01: 4 * n bits MSI length == 0b10: 5 * n bits MSI length == 0b11: 6 * n bits |
| Unicast Available Interval End | Variable | In unit of frames where n is Number of Unicast Available Intervals. The AMS stays at primary carrier from Unicast Available Interval Start to Unicast Available Interval End. MSI length == 0b00: 3 * n bits MSI length == 0b01: 4 * n bits MSI length == 0b10: 5 * n bits MSI length == 0b11: 6 * n bits |

TABLE 5

| Syntax | Size (bits) | Notes |
| --- | --- | --- |
| AAI-DSA_RSP Message format( ) | | |
| Control Message Type | 8 | |
| FID Change Count | 4 | The change count of this transaction assigned by the sender. If a new transaction is started, FID Change Count is incremented by one (modulo 16) by the sender. |
| Confirmation Code | 1 | Zero indicates the request was successful. Nonzero indicates failure. |
| E-MBS Service | 12 | Indicates whether the MBS service being requested or provided for the connection that is being setup. 0: No available E-MBS 1: E-MBS in Serving ABS Only 2: E-MBS in a multi-ABS Zone supporting macro-diversity 3: E-MBS in a multi-ABS Zone not supporting macro-diversity |
| E-MBS Zone ID | 7 | Indicates an E-MBS zone where the connection for associated service flow is valid. |
| E-MBS Service Flow Parameter | variable | Mapping of E-MBS ID and FID |
| Physical Carrier Index | 6 | Target carrier which the AMS switches or is redirected by ABS to, only included in ABS initiated DSA-REQ |
| Carrier switching start time | TBD | TBD LSB bits of Superframe numbers at carrier switching start time |
| Unicast Available Interval Start | variable | In unit of frames where n is Number of Unicast Available Intervals. The AMS stays at primary carrier from Unicast Available Interval Start to Unicast Available Interval End. MSI length == 0b00: 3 * n bits MSI length == 0b01: 4 * n bits MSI length == 0b10: 5 * n bits MSI length == 0b11: 6 * n bits |
| Unicast Available Interval End | Variable | In unit of frames where n is Number of Unicast Available Intervals. The AMS stays at primary carrier from Unicast Available Interval Start to Unicast Available Interval End. MSI length == 0b00: 3 * n bits MSI length == 0b01: 4 * n bits MSI length == 0b10: 5 * n bits |

TABLE 5-continued

| Syntax | Size (bits) | Notes |
|---|---|---|
| | | MSI length == 0b11: 6 * n bits |

The E-MBS Service field indicates whether E-MBS is requested or provided, and the E-MBS Zone ID field indicates an E-MBS zone where a connection related to a service flow is a valid. The E-MBS Service Flow Parameter field includes an E-MBS ID and FID mapping. The Physical Carrier Index is a target carrier to which a terminal switches or a target carrier redirected by a base station.

According to an exemplary embodiment of the present invention, to switch from the primary carrier to the secondary carrier, the carrier switching start time, the Unicast Available Interval Start, and the Unicast Available Interval END information may also be included. The Carrier switching start time represents a point at which a terminal switches from the primary carrier to the secondary carrier. The Unicast Available Interval Start 1310 is a start point of the Unicast Available Interval Start 1310 and a frame of a point 1325 at which a terminal switches from the primary carrier to the secondary carrier. The Unicast Available Interval END 1315 is a frame of a point 1330 at which a terminal switches from the primary carrier to the secondary carrier in order to listen E-MBS data. A frame between the Unicast Available Interval start/end is referred to as a Unicast Available Interval 1315.

The base station incorporates the Unicast Available Interval start 1310 and the Unicast Available Interval end 1320 into a relevant terminal to indicate efficient carrier switching of the terminal. An E-MBS data burst serviced via the secondary carrier is sequentially filled from the front portion of the frame. The terminal receives an E-MBS data burst viewed by the terminal via a downlink of the secondary carrier during E-MBS/Unicast Available Interval 1305.

When an E-MBS data burst occurs irregularly during MSI, that is, when a plurality of Unicast Available Intervals exist during the MSI, each Unicast Available Interval start 1310 and each Unicast Available Interval end 1320 information may be included in an AAI_DSA-REQ message or an AAI_DSA-RSP message.

The terminal switches to the primary carrier at the Unicast Available Interval start point 1310 to determine uplink/downlink besides an E-MBS data burst and to perform communication with the base station up to a point of Unicast Available Interval End 1320. The Unicast Available Interval 1315 may be determined by the base station based on a currently set E-MBS service number. When the terminal adds or deletes E-MBS, the base station may reset Unicast Available Interval 1315 with consideration of a frame via which a relevant service is transmitted. This may be valid for one E-MBS Scheduling Interval (MSI) or a plurality of MSIs, or the base station may reset Unicast Available Interval 1315 several times during one MSI.

A more detailed operation by an exemplary embodiment of the present invention is described with reference to FIGS. 14 to 17.

Figure 14:
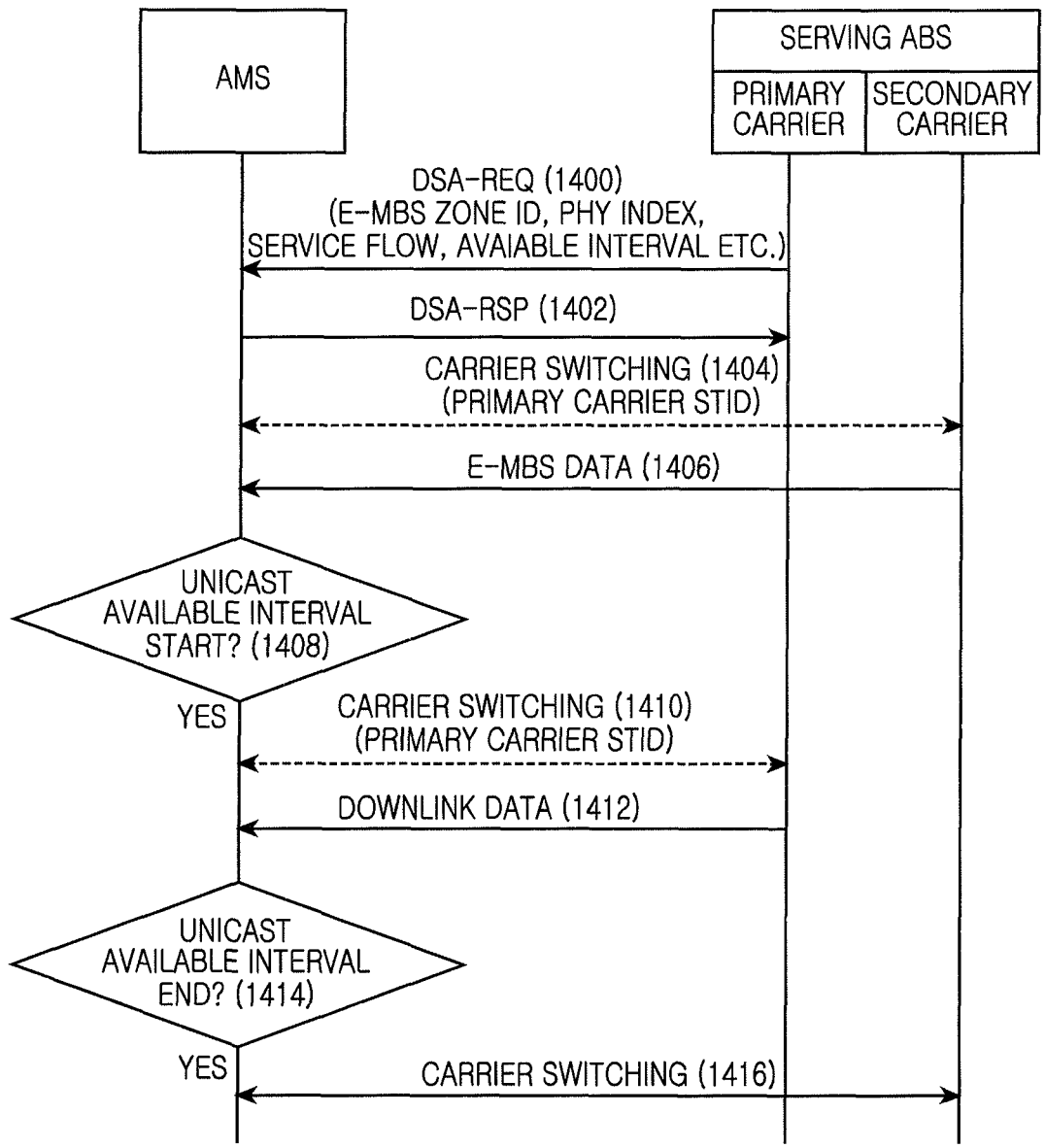
FIG. 14 illustrates a multicast message transmitting procedure in a wireless communication system according to an exemplary embodiment of the present invention.

FIG. 14 illustrates a multicast message transmitting procedure in a wireless communication system according to an exemplary embodiment of the present invention. In the wireless communication system, a terminal performs a network entry procedure based on a primary carrier to perform data communication or to be in a state that enables data communication.

Referring to FIG. 14, when the terminal transmits (not shown) an E-MBS application message to a server in order to start E-MBS service connection, a serving base station transmits a DSA-REQ message to the terminal via a primary carrier in step 1400. The DSA-REQ message includes an E-MBS zone ID, an E-MBS Service Flow Parameter, a Physical Carrier Index, a Carrier switching start time, and a Unicast Available Interval start/end (refer to Table 4).

The terminal determines the E-MBS zone ID, the E-MBS Service Flow Parameter, the Physical Carrier Index, the Carrier switching start time, and the Unicast Available Interval start/end included in the DSA-REQ message via the primary carrier and then transmits a DSA-RSP message of Table 5 to the serving base station in step 1402. The DSA-RSP message includes a 'Confirmation Code' field. When the terminal does not want E-MBS, the 'Confirmation Code' field is set to 0x00. When the terminal desires to receive E-MBS, the 'Confirmation Code' field is set to 0x01.

When starting the E-MBS initially, the serving base station may transmit various E-MBS ID+FIDs set as a default to the terminal at a time. The serving base station sets several E-MBS service flow parameters designated as a default group service at a time, and this may be determined depending on a policy of a service provider.

The terminal and the serving base station switch from the primary carrier to the secondary carrier at the Carrier switching start time to prepare to transmit/receive E-MBS data in step 1404.

The serving base station multicasts E-MBS data via the secondary carrier. The terminal receives E-MBS data via the secondary carrier in step 1406.

The terminal and the serving base station determine whether the Unicast Available Interval Start point arrives in step 1408, and switches from the primary carrier to the secondary carrier in step 1410. The serving base station transmits downlink data to the terminal via the primary carrier during the Unicast Available Interval in step 1412. The terminal may transmit uplink data to the serving base station via the primary carrier.

The terminal determines whether the Unicast Available Interval end point arrives in step 1414, and switches from the primary carrier to the secondary carrier at the Unicast Available Interval end point in step 1416.

Figure 17:
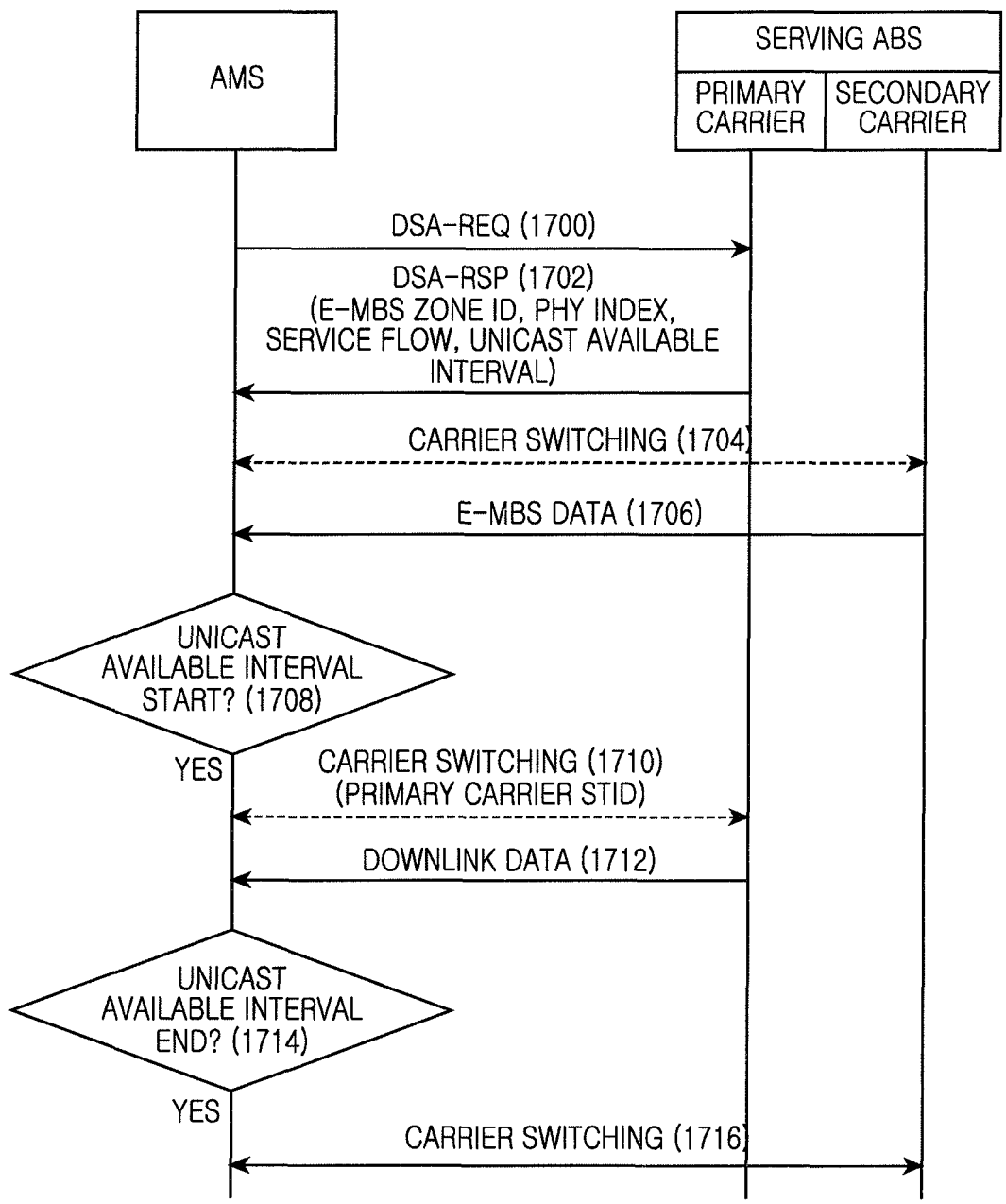
FIG. 17 illustrates a multicast message transmitting procedure in a wireless communication system according to an exemplary embodiment of the present invention.

Depending on realization, the terminal may transmit a DSA-REQ message to the base station, and receive a DSA-RSP message from the base station (refer to FIG. 17).

Figure 15:
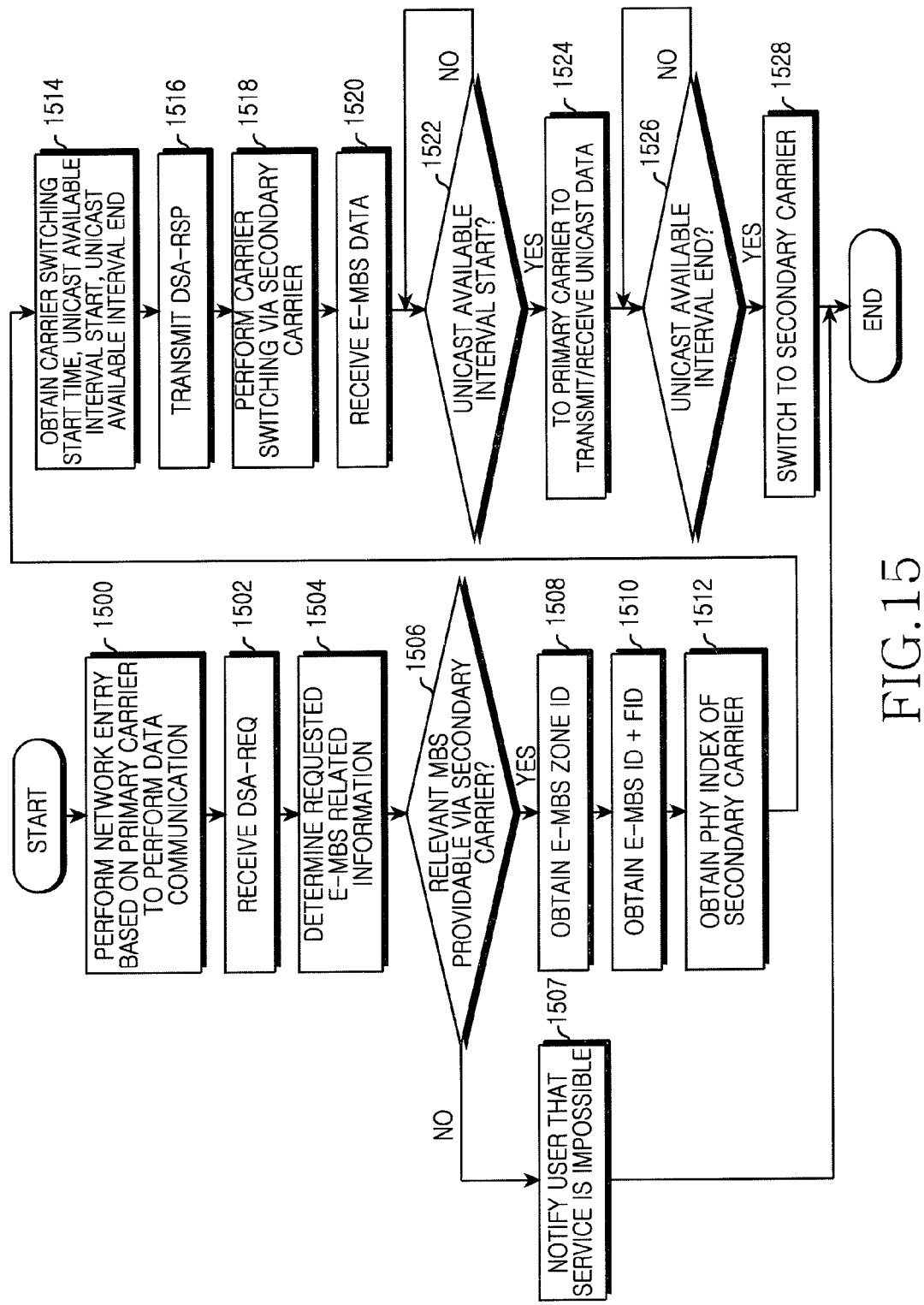
FIG. 15 illustrates a flowchart for operating a terminal for receiving a multicast message in a wireless communication system according to an exemplary embodiment of the present invention.

FIG. 15 illustrates a flowchart for operating a terminal for receiving a multicast message in a wireless communication system according to an exemplary embodiment of the present invention.

Referring to FIG. 15, the terminal performs a network entry procedure based on a primary carrier to perform data communication in step 1500. The terminal transmits data to a base station via STID obtained during the network entry procedure.

When the terminal wants E-MBS, the terminal transmits an E-MBS application message to an MBS server, and receives a DSA-REQ message including an E-MBS zone ID, an E-MBS Service Flow Parameter, a Physical Carrier Index, a Carrier switching start time, and a Unicast Available Interval start/end from the base station in step 1502.

The terminal determines E-MBS related information included in the DSA-REQ message in step 1504, and determines whether E-MBS is possible via a secondary carrier for only MBS in step 1506.

When E-MBS is impossible via the secondary carrier for only MBS in step 1506, the terminal proceeds to step 1507 to operate in a relevant mode. For example, the terminal notifies a user that E-MBS is impossible in the relevant mode.

When E-MBS is possible via the secondary carrier for only MBS in step 1506, the terminal proceeds to step 1508 to obtain the E-MBS zone ID. The terminal obtains the E-MBS ID+FID of MBS Service Flow Parameter in step 1510, obtains the Physical Carrier Index of the secondary carrier in step 1512, and obtains the carrier switching start time and the Unicast Available Interval start/end in step 1514. The terminal obtains the E-MBS zone ID, the E-MBS ID+FID, the Physical Carrier Index of the secondary carrier, the carrier switching start time and the Unicast Available Interval start/end from the base station via the DSA-REQ message. When not requesting a specific E-MBS service channel at the base station, the terminal is allocated a plurality of E-MBS ID+FIDs designated as a default.

The terminal transmits a DSA-RSP message to the base station in response to the DSA-REQ message in step 1516.

The terminal switches from the primary carrier to the secondary carrier at carrier switching start time in step 1518, and receives E-MBS data from the base station in step 1520. The terminal receives E-MBS data using the secondary carrier based on the E-MBS ID+FID obtained via the primary carrier.

The terminal determines whether the Unicast Available Interval start point arrives in step 1522, and switches from the secondary carrier to the primary carrier at the Unicast Available Interval start point to transmit/receive unicast data in step 1524.

The terminal determines whether the Unicast Available Interval end point arrives in step 1526, and switches from the primary carrier to the secondary carrier at the Unicast Available Interval end point in step 1528.

Figure 16:
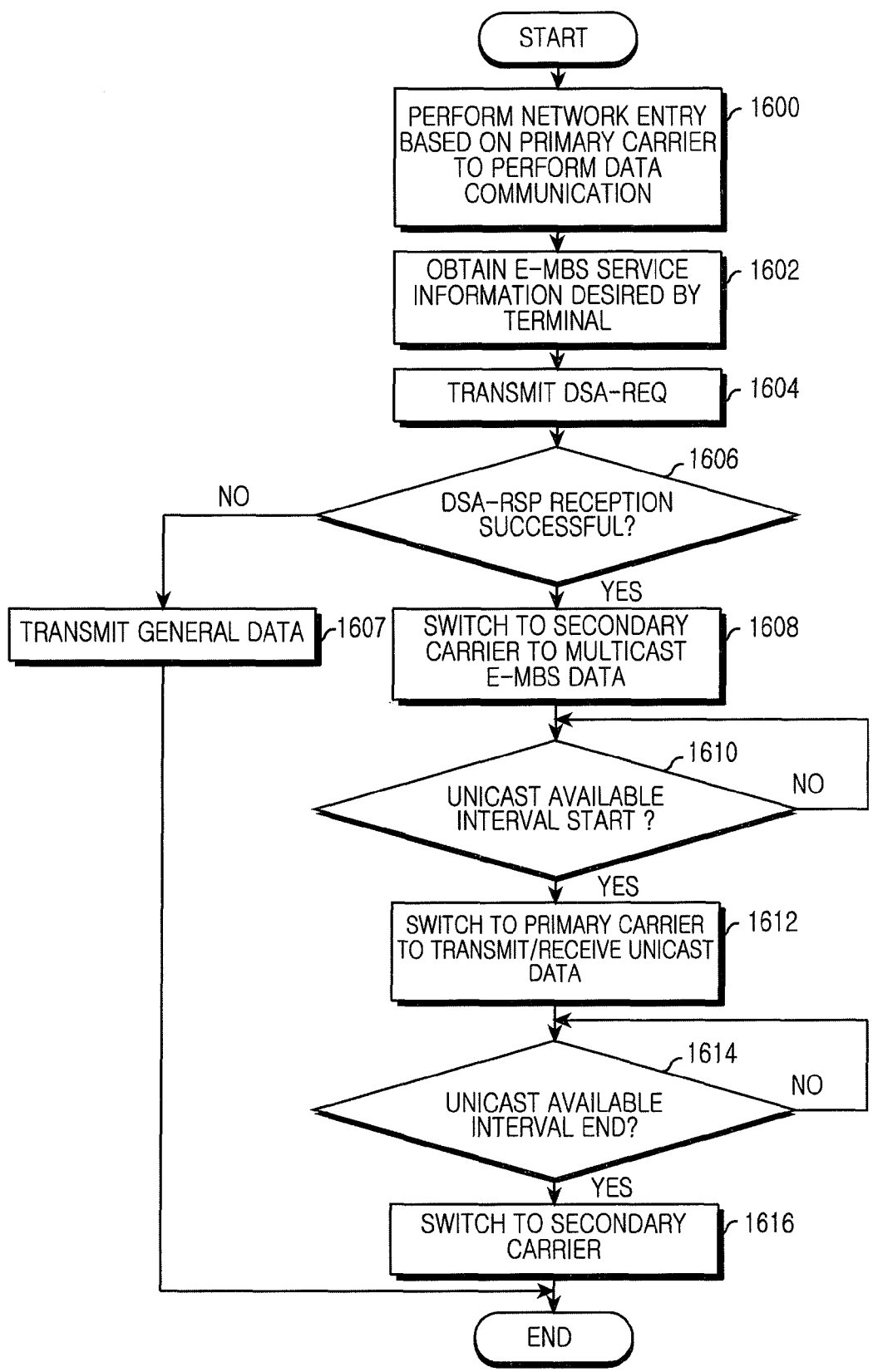
FIG. 16 illustrates a flowchart for operating a base station for transmitting a multicast message in a wireless communication system according to an exemplary embodiment of the present invention.

FIG. 16 is a flowchart for operating a base station for transmitting a multicast message in a wireless communication system according to an exemplary embodiment of the present invention.

Referring to FIG. 16, the base station performs a network entry procedure with a terminal via a primary carrier to perform data communication with the terminal in step 1600.

The base station triggers an E-MBS message or recognizes that the terminal requests E-MBS via an MBS server and determines an E-MBS service flow desired by the terminal, that is, related E-MBS service information together with E-MBS ID+FID information in step 1602.

The base station transmits a DSA-REQ message including an E-MBS zone ID, an E-MBS Service Flow Parameter, a Physical Carrier Index, a Carrier switching start time, and a Unicast Available Interval start/end to the terminal via the primary carrier in step 1604.

The base station receives a DSA-RSP message via the primary carrier in response to the DSA-REQ message, and determines whether to provide E-MBS to the terminal based on the DSA-RSP message in step 1606.

When E-MBS cannot be provided to the terminal via a secondary carrier in step 1606, the base station proceeds to step 1607 to continue to perform the general data communication via the primary carrier.

When E-MBS can be provided to the terminal via the secondary carrier in step 1606, the base station proceeds to step 1608 to switch from the primary carrier to the secondary carrier and unicast E-MBS data to the terminal.

The base station determines whether the Unicast Available Interval start point arrives in step 1610, and switches from the secondary carrier to the primary carrier at the Unicast Available Interval start point to transmit/receive unicast data in step 1612.

The base station determines whether the Unicast Available Interval end point arrives in step 1614, and switches from the primary carrier to the secondary carrier at the Unicast Available Interval end point in step 1616.

FIG. 17 illustrates a multicast message transmitting procedure in a wireless communication system according to an exemplary embodiment of the present invention. In the wireless communication system, the terminal performs a network entry procedure based on a primary carrier to perform data communication, or to be in a state that enables data communication.

Referring to FIG. 17, the terminal transmits a DSA-REQ message to a base station in order to start E-MBS service connection in step 1700. The DSA-REQ message includes an E-MBS zone ID, an E-MBS Service Flow Parameter, and a Physical Carrier Index (refer to Table 4). When the terminal transmits the DSA-REQ message to the base station, a Carrier switching start time and a Unicast Available Interval start/end information are not transmitted.

The base station transmits the DSA-RSP message to the terminal via the primary carrier in response to the DSA-REQ message in step 1702. The DSA-RSP message includes the E-MBS zone ID, the E-MBS Service Flow Parameter, the Physical Carrier Index, the Carrier switching start time, and the Unicast Available Interval start/end. In addition, the DSA-REQ message includes a 'Confirmation Code' field. When the terminal does not want E-MBS, the 'Confirmation Code' field is set to 0x00. When the terminal desires to receive E-MBS, the 'Confirmation Code' field is set to 0x01.

The terminal and the serving base station switch from the primary carrier to the secondary carrier at the Carrier switching start time to prepare to transmit/receive E-MBS data in step 1704.

The serving base station multicasts E-MBS data via the secondary carrier. The terminal receives E-MBS data via the secondary carrier in step 1706.

The terminal and the serving base station determine whether the Unicast Available Interval start point arrives in step 1708, and switch from the secondary carrier to the primary carrier at the Unicast Available Interval start point in step 1710. The serving base station transmits downlink data to the terminal via the primary carrier in step 1712. The terminal may transmit uplink data to the serving base station via the primary carrier in step 1712.

The terminal and the serving base station determine whether the Unicast Available Interval end point arrives in step 1714, and switch from the primary carrier to the secondary carrier at the Unicast Available Interval end point in step 1716.

As described above, a wireless communication system that uses a multi-carrier informs an E-MBS data burst section to be received by a terminal during Scheduling interval, so that the terminal may efficiently switch to a carrier provided only for E-MBS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station for Multicast Broadcast Services (MBS) in a wireless communication system that uses a multi-carrier, the method comprising:

performing MBS capability exchange on a terminal using a primary carrier;

receiving a first message for configuring at least one MBS service flow from the terminal;
transmitting a second message to the terminal in response to the first message, the second message including switching information between the primary carrier and a secondary carrier; and
transmitting MBS data using the secondary carrier.

2. The method of claim 1, wherein the first message comprises one of a Dynamic Service Addition-Request (DSA-REQ) message, a Dynamic Service Change-Request (DSC-REQ) message, and a Dynamic Service Deletion-Request (DSD-REQ) message, and
the second message comprises one of a Dynamic Service Addition-Response (DSA-RSP) message, a Dynamic Service Change-Response (DSC-RSP) message, and a Dynamic Service Deletion-Response (DSD-RSP) message.

3. The method of claim 1, wherein the second message comprises at least one point of switching from the primary carrier to the secondary carrier during an Enhanced-MBS (E-MBS), an E-MBS Zone ID, an E-MBS Service Flow Parameter, a Physical Carrier Index, an E-MBS Scheduling Interval (MSI), and at least one point of switching from the secondary carrier to the primary carrier during the MSI.

4. The method of claim 1, wherein the transmitting of the MBS data using the secondary carrier comprises:
switching from the primary carrier to the secondary carrier at least one time based on the switching information between the primary carrier and the secondary carrier to transmit the MBS data during an Enhanced-MBS (E-MBS) Scheduling Interval (MSI); and
switching from the secondary carrier to the primary carrier at least one time.

5. The method of claim 1, further comprising:
switching from the secondary carrier to the primary carrier based on the switching information between the primary carrier and the secondary carrier during an Enhanced-MBS (E-MBS) Scheduling Interval (MSI); and
transmitting downlink data to the terminal or receiving uplink data from the terminal using the primary carrier.

6. The method of claim 1, wherein the performing of the MBS capability exchange on the terminal comprises:
receiving a registration request (REG-REQ) message from the terminal; and
transmitting a registration response (REG-RSP) message to the terminal.

7. The method of claim 1, further comprising, when the switching information between the primary carrier and the secondary carrier is not included in the second message:
receiving an MBS report message from the terminal; and
transmitting an MBS response message to the terminal in response to the MBS report message, the MBS response message including a Unicast Available Interval Bitmap indicating a start point at which the terminal performs a switching operation between the primary carrier and the secondary carrier, and a point at which the terminal is able to use the primary carrier to schedule unicast.

8. A method for operating a terminal for Multicast Broadcast Services (MBS) in a wireless communication system that uses a multi-carrier, the method comprising:
performing MBS capability exchange with a base station using a primary carrier;
transmitting a first message for configuring at least one MBS service flow to the base station;
receiving a second message including switching information between the primary carrier and a secondary carrier from the base station in response to the first message; and
receiving MBS data using the secondary carrier.

9. The method of claim 8, wherein the first message comprises one of a Dynamic Service Addition-Request (DSA-REQ) message, a Dynamic Service Change-Request (DSC-REQ) message, and a Dynamic Service Deletion-Request (DSD-REQ) message, and
the second message comprises one of a Dynamic Service Addition-Response (DSA-RSP) message, a Dynamic Service Change-Response (DSC-RSP) message, and a Dynamic Service Deletion-Response (DSD-RSP) message.

10. The method of claim 8, wherein the second message comprises at least one point of switching from the primary carrier to the secondary carrier during an Enhanced-MBS (E-MBS), an E-MBS Zone ID, an E-MBS Service Flow Parameter, a Physical Carrier Index, an E-MBS Scheduling Interval (MSI), and at least one point of switching from the secondary carrier to the primary carrier during the MSI.

11. The method of claim 8, wherein the receiving of the MBS data using the secondary carrier comprises:
switching from the primary carrier to the secondary carrier at least one time based on the switching information between the primary carrier and the secondary carrier to receive the MBS data during an Enhanced-MBS (E-MBS) Scheduling Interval (MSI); and
switching from the secondary carrier to the primary carrier at least one time.

12. The method of claim 8, further comprising:
switching from the secondary carrier to the primary carrier based on the switching information between the primary carrier and the secondary carrier during an Enhanced-MBS (E-MBS) Scheduling Interval (MSI); and
receiving downlink data from the base station or transmitting uplink data to the base station using the primary carrier.

13. The method of claim 8, wherein the performing of the MBS capability exchange with the base station comprises:
transmitting a Registration-Request (REG-REQ) message to the base station; and
receiving a Registration-Response (REG-RSP) message from the base station.

14. The method of claim 8, further comprising, when the switching information between the primary carrier and the secondary carrier is not included in the second message:
transmitting an MBS report message to the base station; and
receiving an MBS response message comprising a Unicast Available Interval Bitmap indicating a start point at which the terminal performs a switching operation between the primary carrier and the secondary carrier, and a point at which the terminal is able to use the primary carrier to schedule unicast, from the base station in response to the MBS report message.

15. An apparatus of a base station, for Multicast Broadcast Services (MBS) in a wireless communication system that uses a multi-carrier, the apparatus comprising:
a controller for performing MBS capability exchange on a terminal using a primary carrier;
a receiver for receiving a first message for configuring at least one MBS service flow from the terminal; and
a transmitter for transmitting a second message to the terminal in response to the first message, the second message including switching information between the primary carrier and a secondary carrier, and for transmitting MBS data using the secondary carrier.

16. The apparatus of claim 15, wherein the first message comprises one of a Dynamic Service Addition-Request (DSA-REQ) message, a Dynamic Service Change-Request (DSC-REQ) message, and a Dynamic Service Deletion-Request (DSD-REQ) message, and the second message comprises one of a Dynamic Service Addition-Response (DSA-RSP) message, a Dynamic Service Change-Response (DSC-RSP) message, and a Dynamic Service Deletion-Response (DSD-RSP) message.

17. The apparatus of claim 15, wherein the second message comprises at least one point of switching from the primary carrier to the secondary carrier during an Enhanced-MBS (E-MBS), an E-MBS Zone ID, an E-MBS Service Flow Parameter, a Physical Carrier Index, an E-MBS Scheduling Interval (MSI), and at least one point of switching from the secondary carrier to the primary carrier during the MSI.

18. The apparatus of claim 15, further comprising a carrier switching unit for switching from the primary carrier to the secondary carrier at least one time based on the switching information between the primary carrier and the secondary carrier during an Enhanced-MBS (E-MBS) Scheduling Interval (MSI), and for switching from the secondary carrier to the primary carrier at least one time.

19. The apparatus of claim 15, further comprising:
a carrier switching unit for switching from the secondary carrier to the primary carrier based on the switching information between the primary carrier and the secondary carrier during MSI,
wherein the transmitter transmits downlink data to the terminal or the receiver receives uplink data from the terminal using the primary carrier.

20. The apparatus of claim 15, wherein the receiver receives a registration request (REG-REQ) message from the terminal, and the transmitter transmits a registration response (REG-RSP) message to the terminal.

21. The apparatus of claim 15, wherein when the switching information between the primary carrier and the secondary carrier is not included in the second message, the receiver receives an MBS report message from the terminal, and
the transmitter transmits an MBS response message comprising a Unicast Available Interval Bitmap indicating a start point at which the terminal performs a switching operation between the primary carrier and the secondary carrier, and a point at which the terminal is able to use the primary carrier to schedule unicast, to the terminal in response to the MBS report message.

22. An apparatus of a terminal, for Multicast Broadcast Services (MBS) in a wireless communication system that uses a multi-carrier, the apparatus comprising:
a controller for performing MBS capability exchange with a base station using a primary carrier;
a transmitter for transmitting a first message for configuring at least one MBS service flow to the base station; and
a receiver for receiving a second message from the base station in response to the first message, the second message including switching information between the primary carrier and a secondary carrier, and for receiving MBS data using the secondary carrier.

23. The apparatus of claim 22, wherein the first message comprises one of a Dynamic Service Addition-Request (DSA-REQ) message, a Dynamic Service Change-Request (DSC-REQ) message, and a Dynamic Service Deletion-Request (DSD-REQ) message, and the second message comprises one of a Dynamic Service Addition-Response (DSA-RSP) message, a Dynamic Service Change-Response (DSC-RSP) message, and a Dynamic Service Deletion-Response (DSD-RSP) message.

24. The apparatus of claim 22, wherein the second message comprises at least one point of switching from the primary carrier to the secondary carrier during an Enhanced-MBS (E-MBS), an E-MBS Zone ID, an E-MBS Service Flow Parameter, a Physical Carrier Index, an E-MBS Scheduling Interval (MSI), and at least one point of switching from the secondary carrier to the primary carrier during the MSI.

25. The apparatus of claim 22, further comprising a carrier switching unit for switching from the primary carrier to the secondary carrier at least one time based on the switching information between the primary carrier and the secondary carrier during an Enhanced-MBS (E-MBS) Scheduling Interval (MSI), and for switching from the secondary carrier to the primary carrier at least one time.

26. The apparatus of claim 22, further comprising:
a carrier switching unit for switching from the secondary carrier to the primary carrier based on the switching information between the primary carrier and the secondary carrier during an Enhanced-MBS (E-MBS) Scheduling Interval (MSI),
wherein the receiver receives downlink data from the base station or the transmitter transmits uplink data to the base station using the primary carrier.

27. The apparatus of claim 22, wherein the transmitter transmits a Registration-Request (REG-REQ) message to the base station, and the receiver receives a Registration-Response (REG-RSP) message from the base station.

28. The apparatus of claim 22, wherein when the switching information between the primary carrier and the secondary carrier is not included in the second message, the transmitter transmits an MBS report message to the base station, and
the receiver receives an MBS response message comprising an Unicast Available Interval Bitmap indicating a start point at which the terminal performs a switching operation between the primary carrier and the secondary carrier, and a point at which the terminal is able to use the primary carrier to schedule unicast, from the base station in response to the MBS report message.

29. A wireless communication system that uses a multi-carrier for Multicast Broadcast Services (MBS), the system comprising:
a base station for performing MBS capability exchange on a terminal using a primary carrier, for receiving a first message for configuring at least one MBS service flow from the terminal, for transmitting a second message to the terminal in response to the first message, the second message including switching information between the primary carrier and a secondary carrier, and for transmitting MBS data using the secondary carrier; and
the terminal for performing MBS capability exchange with the base station using the primary carrier, for transmitting the first message to the base station, receiving the second message from the base station in response to the first message, and for receiving MBS data using the secondary carrier.

30. The system of claim 29, wherein the first message comprises one of a Dynamic Service Addition-Request (DSA-REQ) message, a Dynamic Service Change-Request (DSC-REQ) message, and a Dynamic Service Deletion-Request (DSD-REQ) message, and the second message comprises one of a Dynamic Service Addition-Response (DSA-RSP) message, a Dynamic Service Change-Response (DSC-RSP) message, and a Dynamic Service Deletion-Response (DSD-RSP) message.

31. The system of claim 29, wherein the second message comprises at least one point of switching from the primary carrier to the secondary carrier during an Enhanced-MBS (E-MBS), an E-MBS Zone ID, an E-MBS Service Flow Parameter, a Physical Carrier Index, an E-MBS Scheduling Interval (MSI), and at least one point of switching from the secondary carrier to the primary carrier during MSI.

32. A wireless communication system that uses a multi-carrier for Multicast Broadcast Services (MBS), the system comprising:
   a base station for performing MBS capability exchange on a terminal using a primary carrier, for transmitting a first message comprising switching information between the primary carrier and a secondary carrier to the terminal in order to configure at least one MBS service flow, for receiving a second message from the terminal in response to the first message, and for transmitting MBS data using the secondary carrier; and
   the terminal for performing MBS capability exchange with the base station using the primary carrier, for receiving the first message from the base station, for transmitting the second message to the base station in response to the first message, and for receiving MBS data using the secondary carrier.

33. The system of claim 32, wherein the first message comprises one of a Dynamic Service Addition-Request (DSA-REQ) message, a Dynamic Service Change-Request (DSC-REQ) message, and a Dynamic Service Deletion-Request (DSD-REQ) message, and
   the second message comprises one of a Dynamic Service Addition-Response (DSA-RSP) message, a Dynamic Service Change-Response (DSC-RSP) message, and a Dynamic Service Deletion-Response (DSD-RSP) message.

34. The system of claim 32, wherein the second message comprises at least one point of switching from the primary carrier to the secondary carrier during an Enhanced-MBS (E-MBS), an E-MBS Zone ID, an E-MBS Service Flow Parameter, a Physical Carrier Index, an E-MBS Scheduling Interval (MSI), and at least one point of switching from the secondary carrier to the primary carrier during MSI.

* * * * *